(12) United States Patent
Sekita

(10) Patent No.: US 7,382,551 B2
(45) Date of Patent: Jun. 3, 2008

(54) ZOOM LENS SYSTEM AND IMAGE-PICKUP APPARATUS INCLUDING SAME

(75) Inventor: Makoto Sekita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 11/560,002

(22) Filed: Nov. 15, 2006

(65) Prior Publication Data

US 2007/0121215 A1 May 31, 2007

(30) Foreign Application Priority Data

Nov. 30, 2005 (JP) ............................ 2005-347151

(51) Int. Cl.
- G02B 15/00 (2006.01)
- G02B 9/04 (2006.01)
- G02B 9/12 (2006.01)
- G02B 9/34 (2006.01)

(52) U.S. Cl. ...................... 359/686; 359/680; 359/689; 359/691

(58) Field of Classification Search ................ 359/680, 359/686, 689, 691
See application file for complete search history.

(56) References Cited

U.S. PATENT DOCUMENTS

| | | | |
|---|---|---|---|
| 5,009,491 A | 4/1991 | Hata | |
| 5,568,323 A | 10/1996 | Sensui | |
| 5,602,680 A | 2/1997 | Sakamoto | |
| 5,786,942 A * | 7/1998 | Komori et al. | 359/686 |
| 6,124,984 A | 9/2000 | Shibayama et al. | |
| 6,614,599 B1 * | 9/2003 | Watanabe | 359/689 |
| 2004/0150890 A1 | 8/2004 | Sato | |
| 2005/0207024 A1 | 9/2005 | Mihara | |
| 2005/0248854 A1 * | 11/2005 | Takeuchi | 359/680 |
| 2006/0268427 A1 * | 11/2006 | Mihara | 359/686 |

FOREIGN PATENT DOCUMENTS

| | | |
|---|---|---|
| JP | 59-033417 A | 2/1984 |
| JP | 64-040913 A | 2/1989 |
| JP | 07-209581 A | 8/1995 |
| JP | 08-152558 A | 6/1996 |
| JP | 2000-075205 A | 3/2000 |
| JP | 2001-004920 A | 1/2001 |
| JP | 2001-249275 | 9/2001 |

* cited by examiner

Primary Examiner—Darryl J Collins
(74) Attorney, Agent, or Firm—Canon U.S.A., Inc., IP Division

(57) ABSTRACT

At least one exemplary embodiment is directed to a zoom lens system which includes a first lens unit having negative refractive power and a second lens unit having positive refractive power. The first and second lens units are provided in order from the object to image sides. The distance between the first and second lens units change during zooming. The first lens unit includes a compound optical element including a lens element and a resin layer having optical performance different from that of the lens element and being stacked on the lens element. The zoom lens system can satisfy:

$$20 < |\nu dg - \nu dj| \text{ and}$$

$$fg/fj < 0,$$

where $fg$ and $\nu dg$ represent the focal length and the Abbe number of the lens element and $fj$ and $\nu dj$ represent the focal length and the Abbe number of the resin layer.

15 Claims, 15 Drawing Sheets

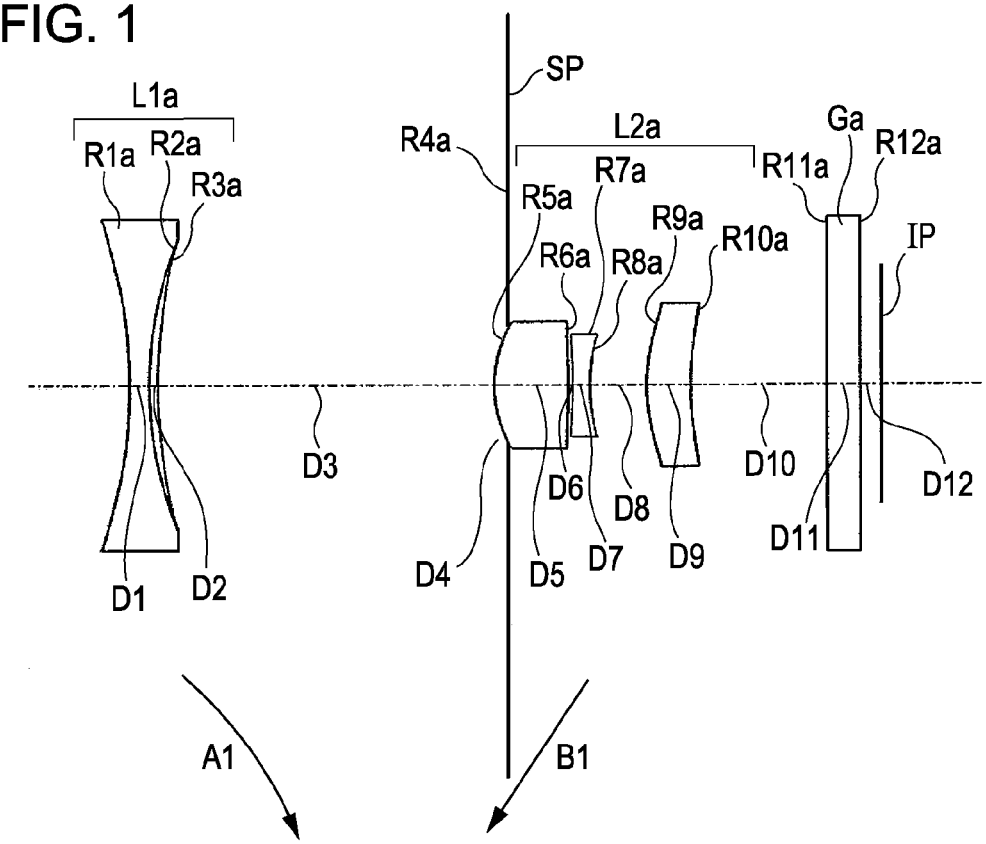
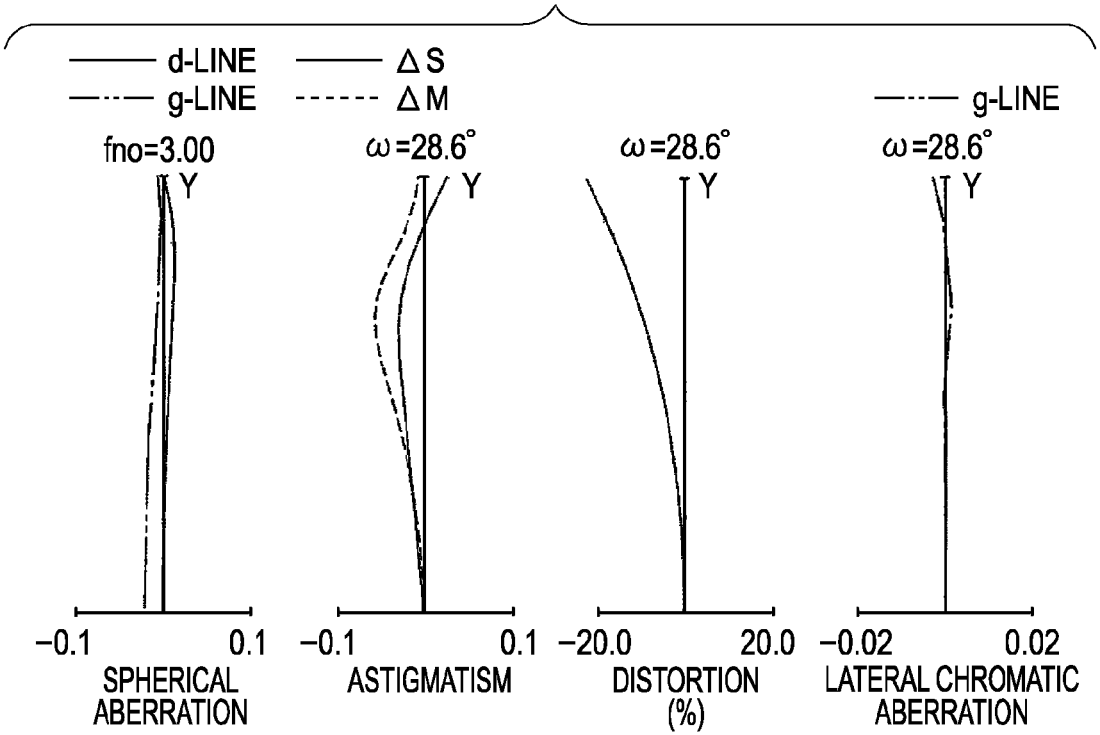

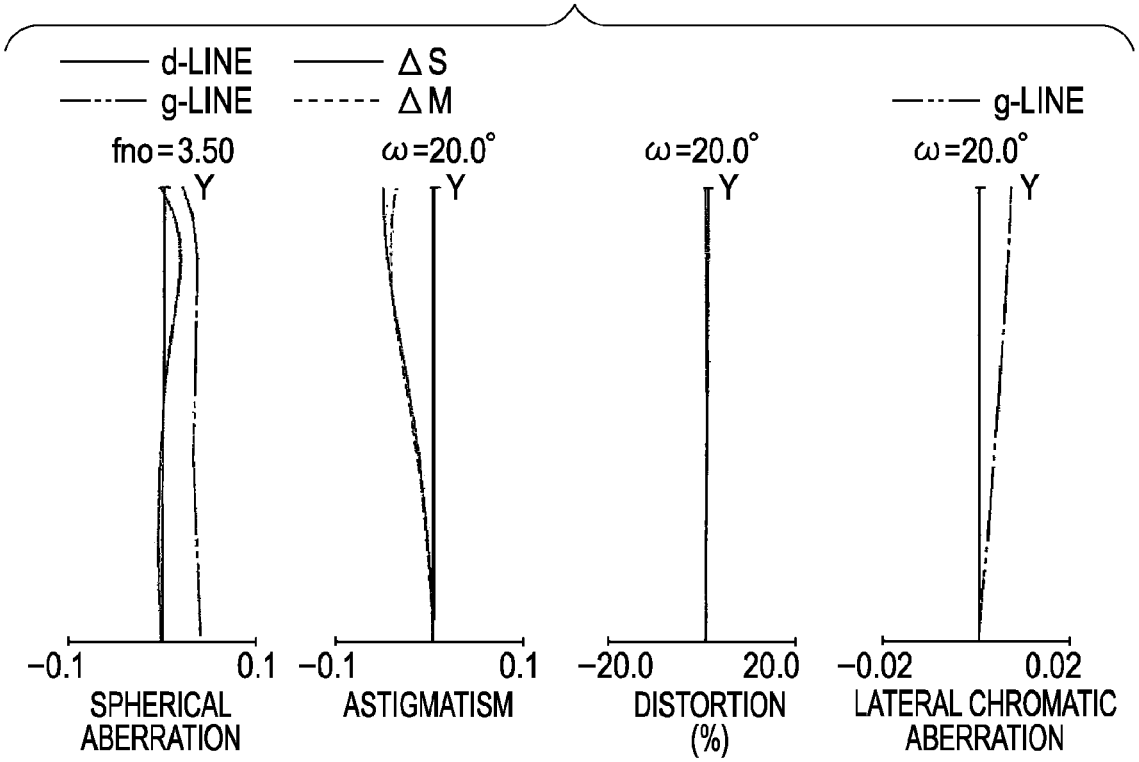
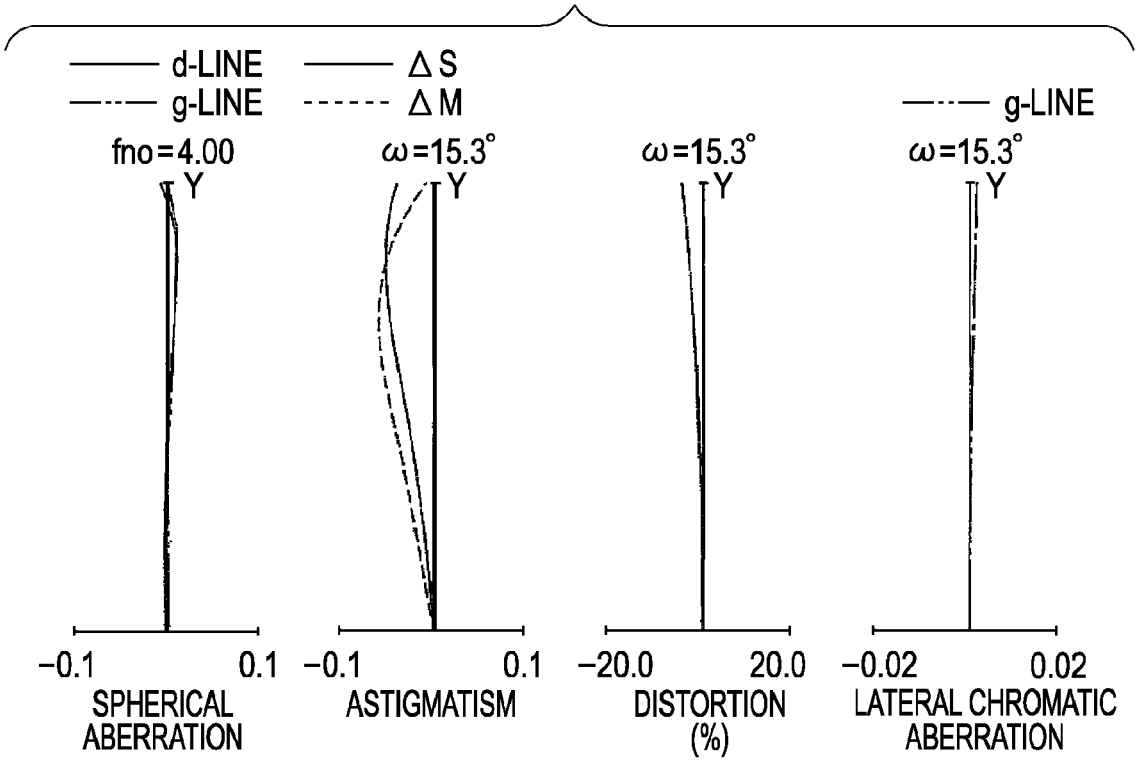

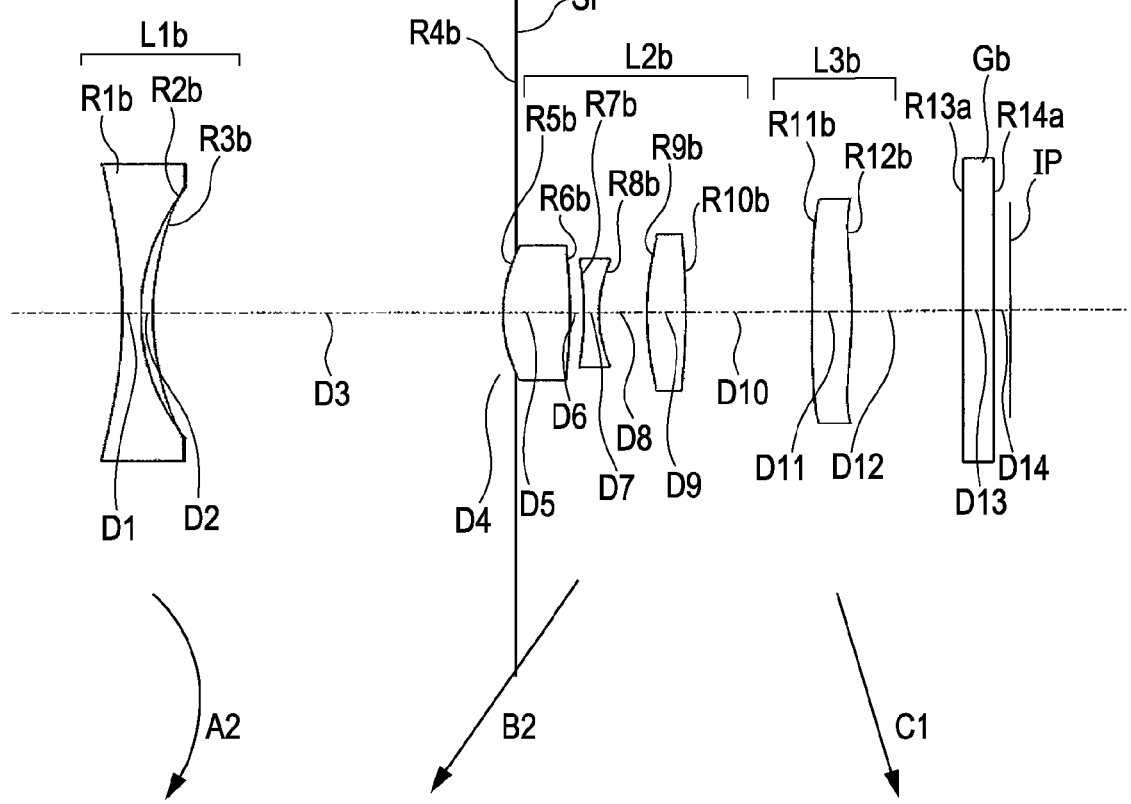
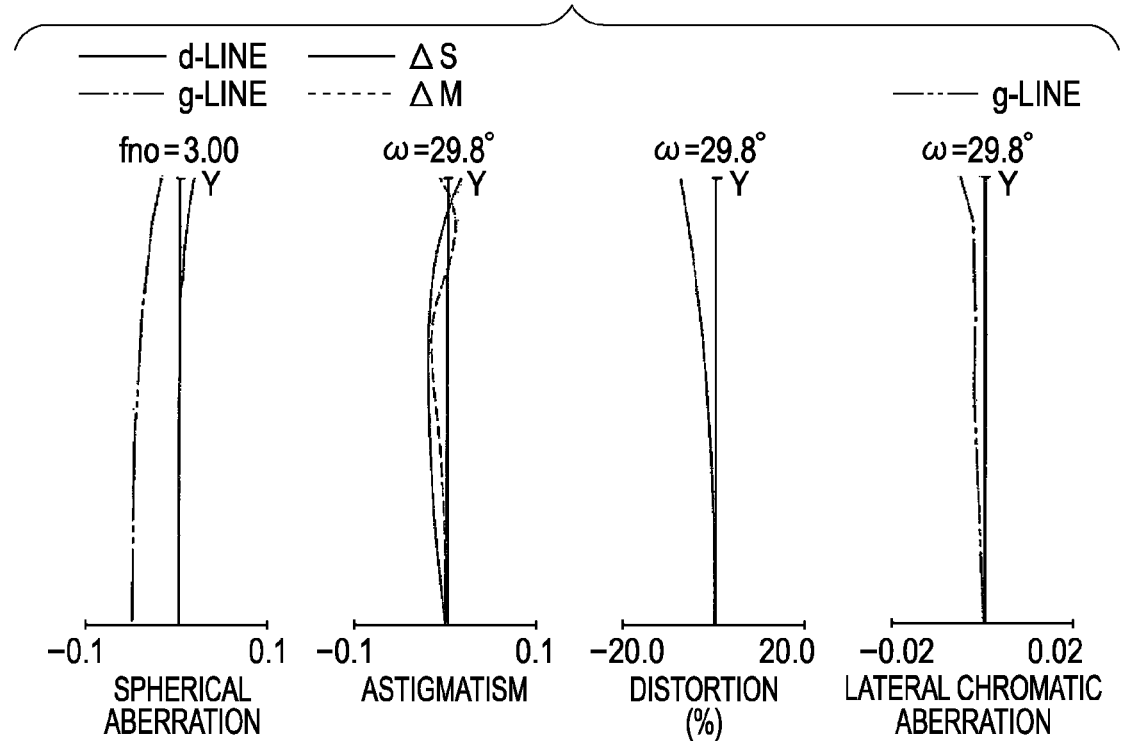

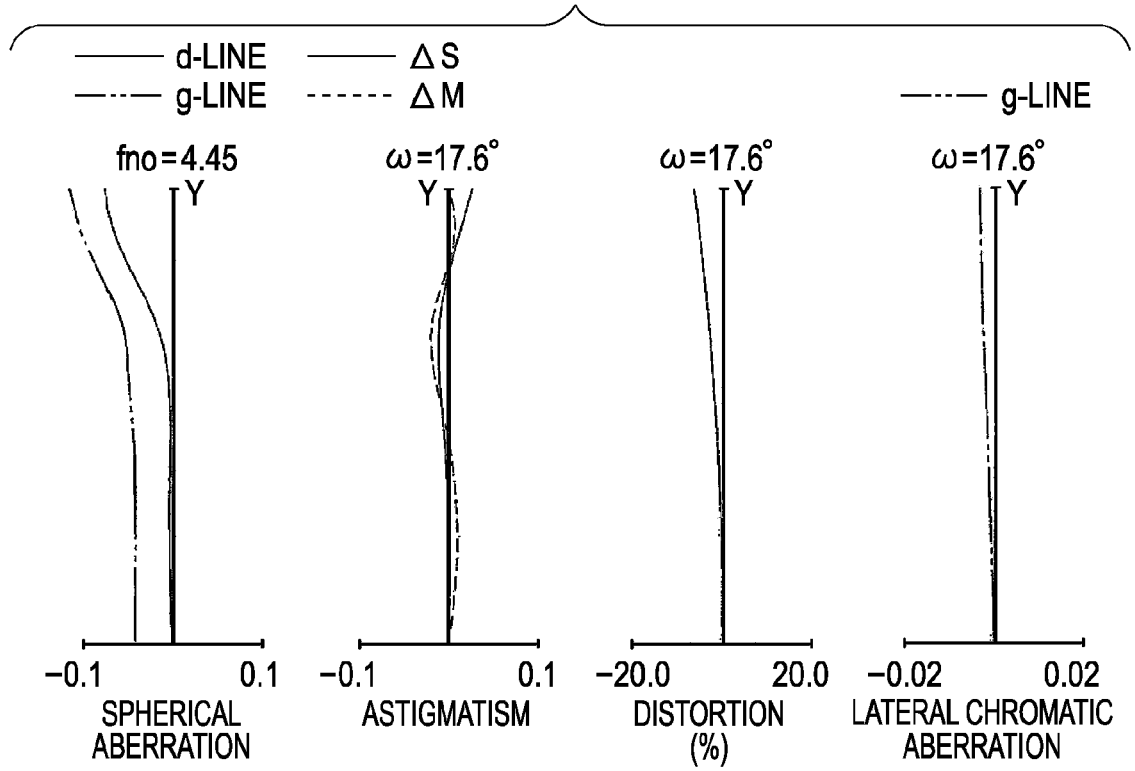
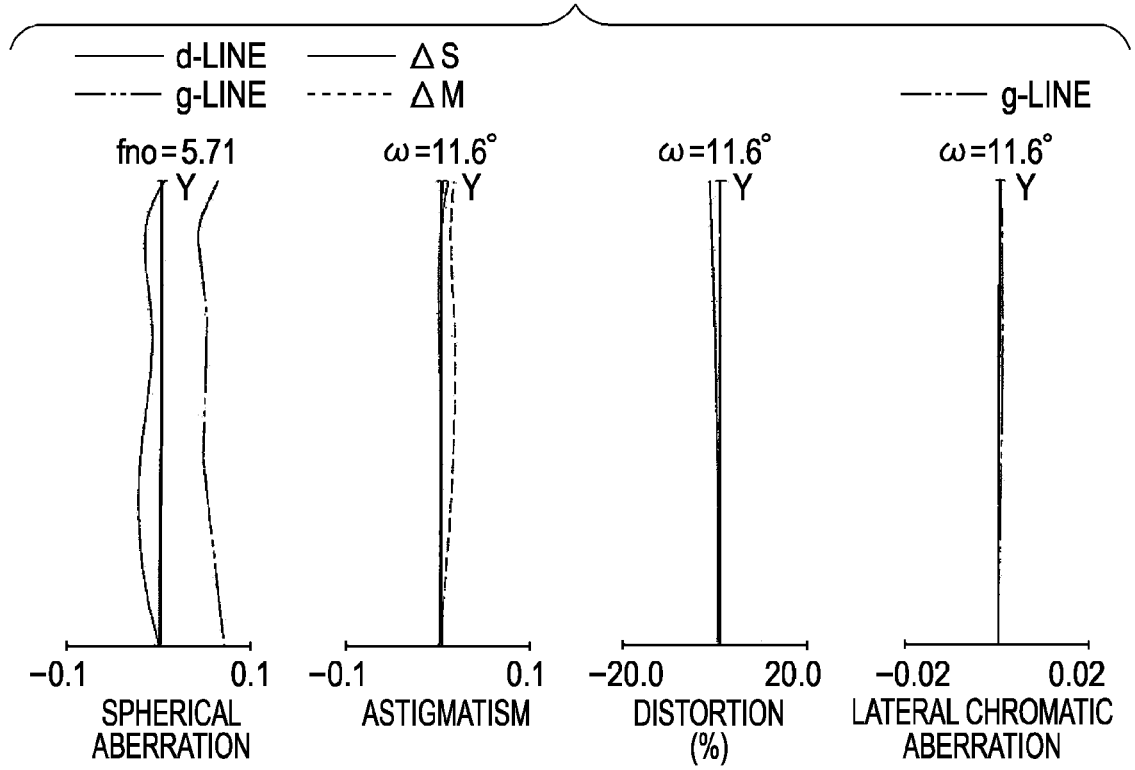

FIG. 25
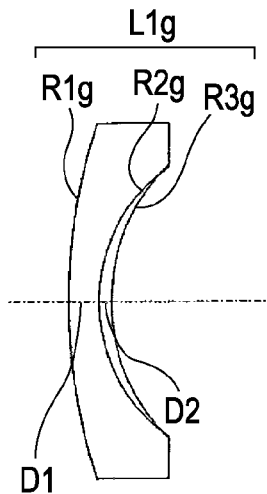
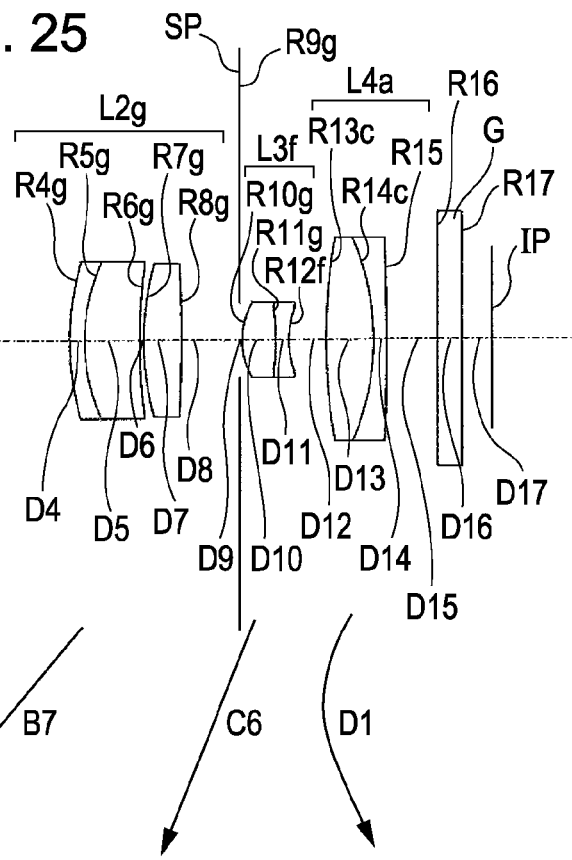
FIG. 26
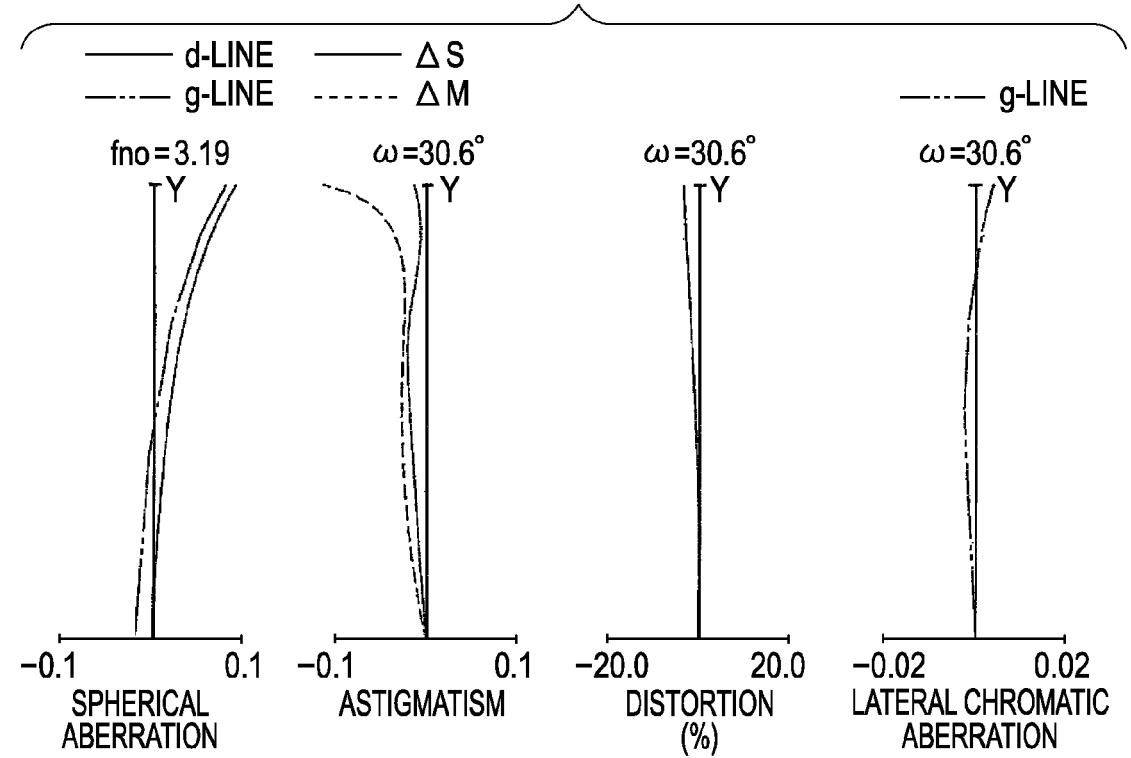

ZOOM LENS SYSTEM AND IMAGE-PICKUP APPARATUS INCLUDING SAME

BACKGROUND OF THE INVENTION

1. Field of the Invention

The present invention relates to lens systems and to an image-pickup apparatus including the lens system.

2. Description of the Related Art

Recently the demand for high-quality image-pickup apparatuses (cameras), such as video cameras and digital still cameras including solid-state image-pickup devices has increased. Moreover, the optical systems used in such image-pickup apparatuses are required to be zoom lenses that have a wide angle of view and a large focal ratio.

Such a camera includes optical members, such as a low-pass filter and a color correction filter, between the rearmost lens and an image-pickup element. Therefore, the zoom lens system used for the image-pickup apparatus is required to have a relatively long back focus.

For a camera including an image-pickup element for color images, the zoom lens system is required to have good telecentricity on the image side.

An example of a zoom lens system that has good telecentricity is a retrofocus zoom lens system that includes a lens unit having negative refractive power and a lens unit having positive refractive power, in this order from the object side to the image side.

An example of a retrofocus zoom lens system has a two-group short zoom lens system that includes a first lens unit having negative refractive power and a second lens unit having positive refractive power and that carries out zooming by changing the distance between the two lens units (refer to Japanese Patent Laid-Open Nos. 59-33417, 7-209581, and 2001-4920).

The two-group zoom lens system carries out zooming by moving the second lens unit having positive refractive power and corrects the position of the image point in accordance with the zooming by moving the first lens unit having negative refractive power. Many typical two-group zoom lens systems have a zoom magnification (zoom ratio) of about two times.

To reduce the size of the entire lens unit while increasing the magnification, a three-group zoom lens system that includes a third lens unit having negative or positive refractive power on the image side of a two-group lens unit is known (refer to Japanese Patent No. 2556046, U.S. Pat. No. 6,124,984, and US Patent Published Application Nos. 2004/0150890 and 2005/0207024).

A four-group lens unit that includes a third lens unit having negative refractive power on the image side of a two-group lens unit and a fourth lens unit having positive refractive power on the image side of a three-group lens unit is known (refer to Japanese Patent No. 3315671 and Japanese Patent Laid-Open No. 8-152558).

Recently, the demand for small video cameras and digital cameras with a zoom lens system having a high zoom ratio has increased. To reduce the entire size of the camera, a retractable lens barrel in which, when the camera is not being used for image-capturing, the distance between the lens units are reduced so that the protrusion amount of the lens from the camera main body is reduced compared to when image-capturing is being carried out.

In general, when the number of lenses included in each lens unit constructing the zoom lens system is large, the length of the lens units on the optical axis is increased, and a desired barrel length cannot be achieved.

To reduce the length of the lens units on the optical axis and to reduce the length of the lens barrel, the number of lenses included in the lens units have to be reduced.

However, when the number of lenses is simply reduced, it becomes difficult to correct aberrations, such as spherical aberration and coma, related to the single-color image-forming performance. Moreover, it becomes difficult to correct chromatic aberration within the limited range of glass material. As a result, it is difficult to reduce the size of the apparatus and to obtain high quality images at the same time.

When the number of lenses included in the entire optical system is reduced, the refractive power of each lens included in the optical system is relatively increased. Therefore, sensitivity to manufacturing error increases, and processing accuracy of the lenses and assembly accuracy of the optical system have to be increased.

Conventionally, by providing the optical system with lenses that have aspherical surfaces, the number of lenses has been reduced while maintaining image-forming performance. When lenses having aspherical surfaces are used, aberration related to the single-color image-forming performance can be corrected. However, it is difficult to correct chromatic aberration that is mostly dependent on the selection of glass material.

A method of processing an aspherical surface is discussed in the embodiments of Japanese Patent Laid-Open Nos. 59-33417, 2001-4920, and 8-152558, U.S. Patent Published Application No. 2004/0150890 and 2005/0207024. In the method discussed in these documents, resin is stacked on the surface of the lens that is provided as a base. An aspherical surface is formed by pressing a metal mold having an aspherical surface against the resin layer.

However, according to these documents, the lens and resin both have negative refractive power, and chromatic aberration is not actively corrected by using the difference in the properties of the lens and resin.

A zoom lens system having excellent optical performance and an image-pickup apparatus including the zoom lens system according to the present invention include a small number of lenses, has a wide view of angle, and is capable of effectively correcting chromatic aberration.

SUMMARY OF THE INVENTION

At least one exemplary embodiment is directed to a zoom lens system that can be used in still cameras, video cameras, and digital still cameras.

A zoom lens system according to an exemplary embodiment of the present invention includes a first lens unit having negative refractive power and a second lens unit having positive refractive power. The first and second lens units are provided in order from the object side to the image side. The distance between the first and second lens units change during zooming. The first lens unit includes a compound optical element being constituted of a lens element and a resin layer having optical performance different from the optical performance of the lens element and being stacked on the lens element. The zoom lens system can satisfy:

$$20 < |vdg - vdj| \text{ and}$$

$$fg/fj < 0,$$

where fg represents the focal length of the lens element, vdg represents the Abbe number of the material of the lens element, fj represents the focal length of the resin layer, and vdj represents the Abbe number of the resin layer.

Further features of the present invention will become apparent from the following description of exemplary embodiments (with reference to the attached drawings).

BRIEF DESCRIPTION OF THE DRAWINGS

FIG. 1 is a cross-sectional view of lens units according to a first exemplary embodiment.

FIG. 2 illustrates aberration at the wide-angle end according to the first exemplary embodiment.

FIG. 3 illustrates aberration at an intermediate zoom position according to the first exemplary embodiment.

FIG. 4 illustrates aberration at the telephoto end according to the first exemplary embodiment.

FIG. 5 is a cross-sectional view of lens units according to a second exemplary embodiment.

FIG. 6 illustrates aberration at the wide-angle end according to the second exemplary embodiment.

FIG. 19 illustrates aberration at an intermediate zoom position according to the fifth exemplary embodiment.

FIG. 20 illustrates aberration at the telephoto end according to the fifth exemplary embodiment.

FIG. 25 is a cross-sectional view of lens units according to a seventh exemplary embodiment.

FIG. 26 illustrates aberration at the wide-angle end according to the seventh exemplary embodiment.

DESCRIPTION OF THE EMBODIMENTS

Figure 7:
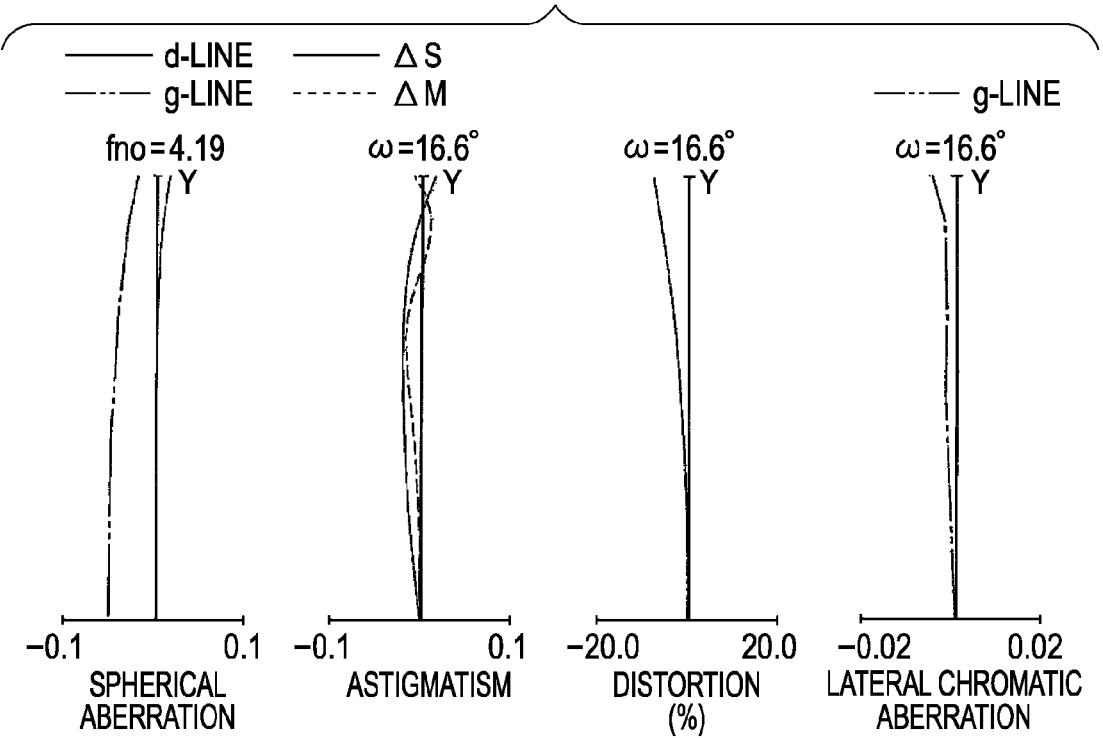
FIG. 7 illustrates aberration at an intermediate zoom position according to the second exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

A zoom lens system and an image-pickup apparatus according to exemplary embodiments of the present invention will be described below.

FIG. 1 is a cross-sectional view of lens units according to a first exemplary embodiment. FIGS. 2, 3, and 4 illustrate aberration at the wide-angle end, an intermediate zoom position, the telephoto end of the zoom lens system, respectively, according to the first exemplary embodiment. The zoom lens system according to the first exemplary embodiment has a zoom ratio of about 2.0 times and an aperture ratio of about 3.0 to 4.0.

Figure 8:
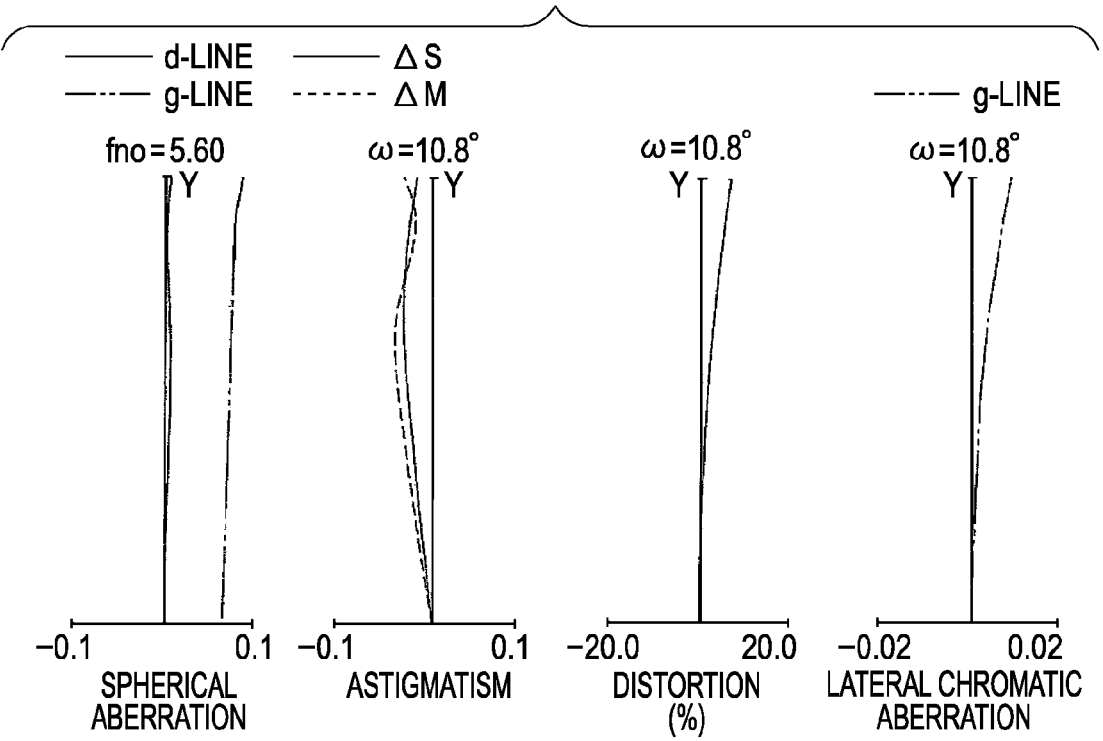
FIG. 8 illustrates aberration at the telephoto end according to the second exemplary embodiment.

FIG. 5 is a cross-sectional view of lens units according to a second exemplary embodiment. FIGS. 6, 7, and 8 illustrate aberration at the wide-angle end, an intermediate zoom position, the telephoto end of the zoom lens system, respectively, according to the second exemplary embodiment. The zoom lens system according to the second exemplary embodiment has a zoom ratio of about 3.0 times and an aperture ratio of about 3.0 to 5.6.

Figure 9:
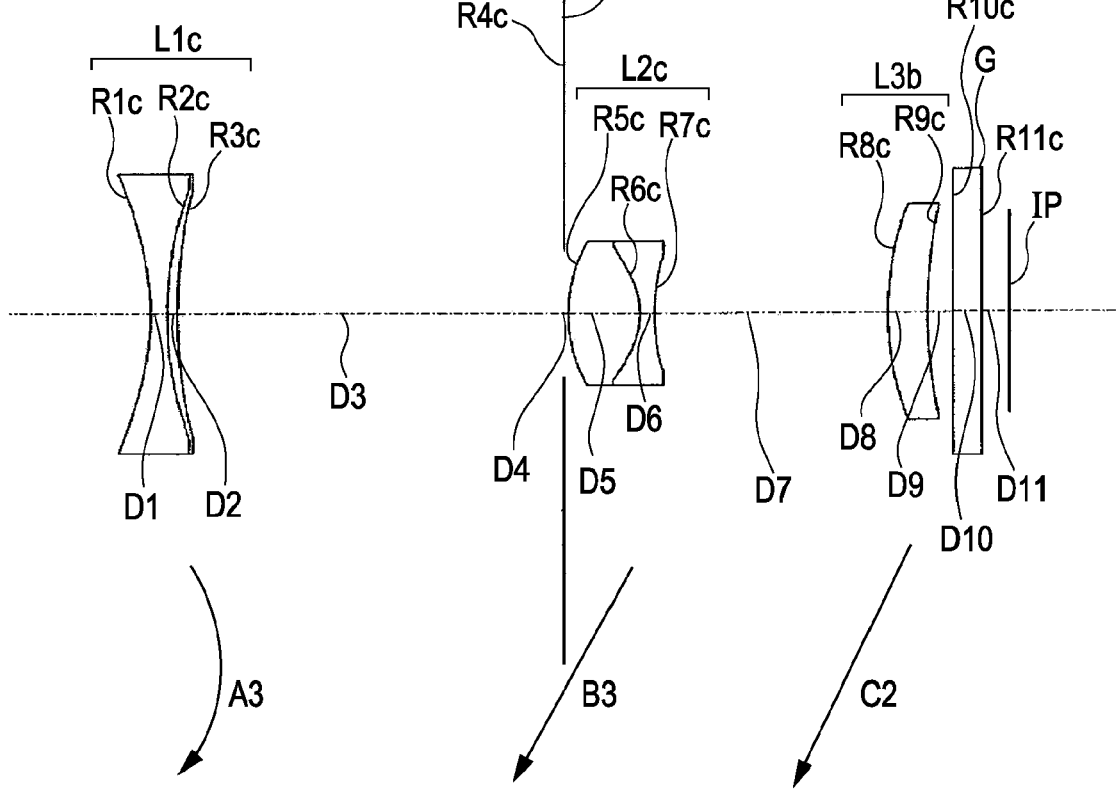
FIG. 9 is a cross-sectional view of lens units according to a third exemplary embodiment.
Figure 10:
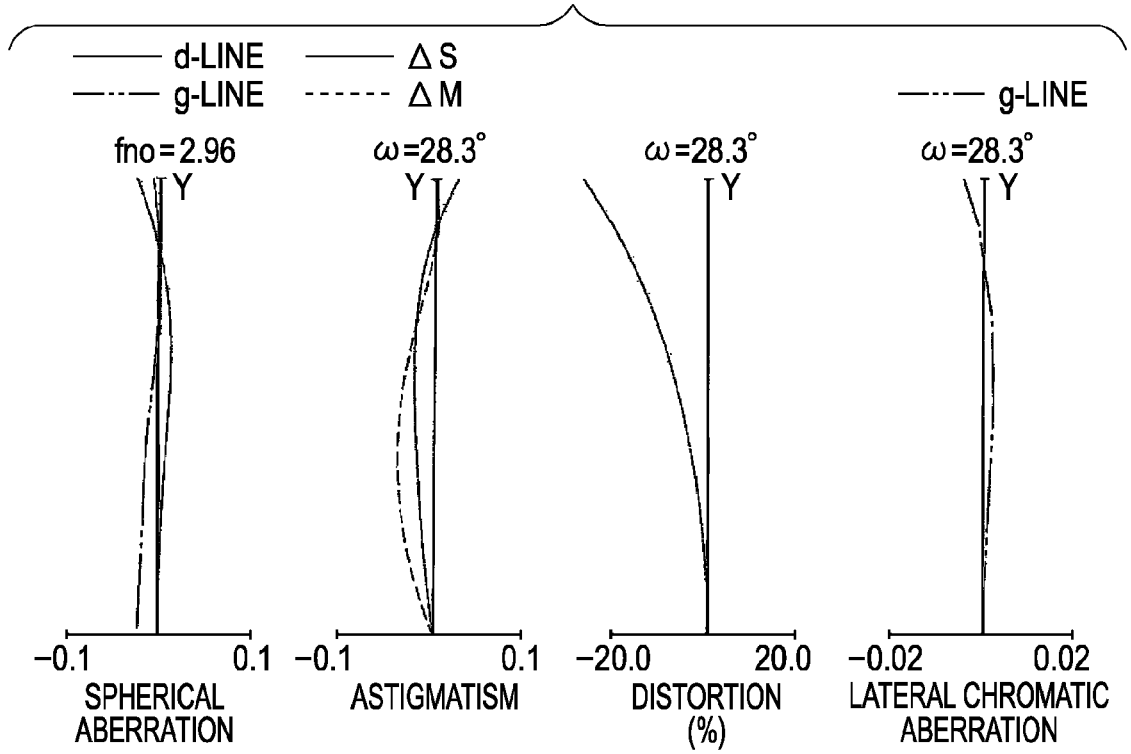
FIG. 10 illustrates aberration at the wide-angle end according to the third exemplary embodiment.
Figure 11:
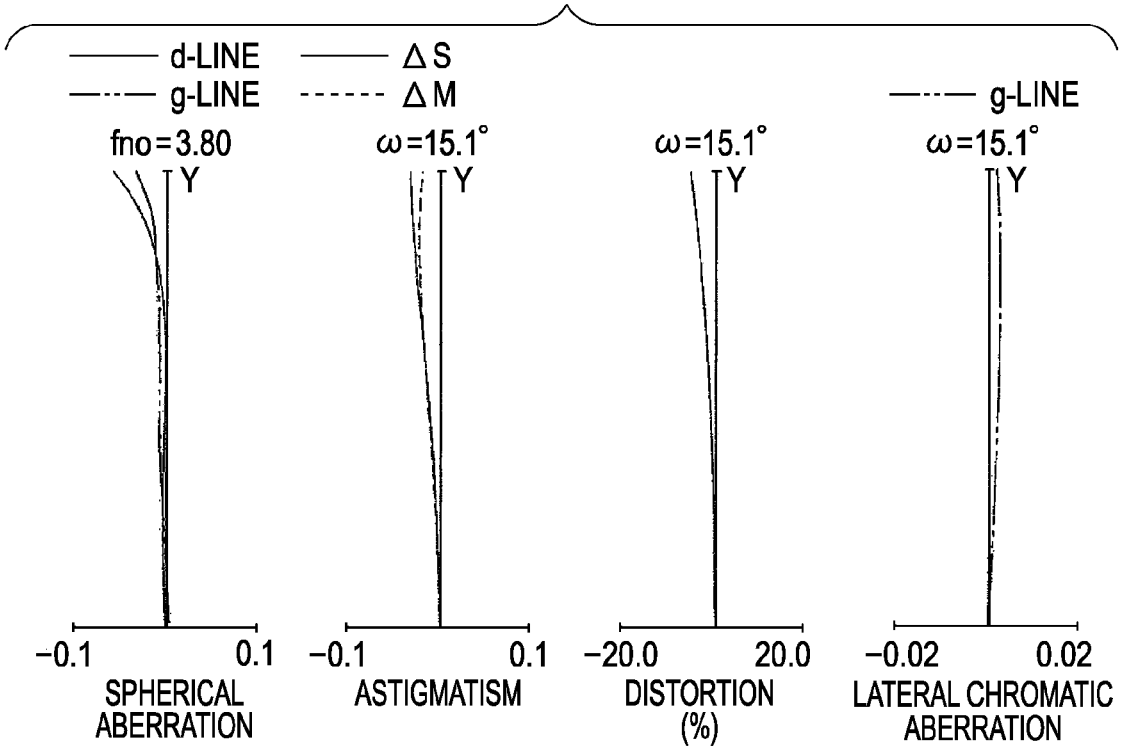
FIG. 11 illustrates aberration at an intermediate zoom position according to the third exemplary embodiment.
Figure 12:
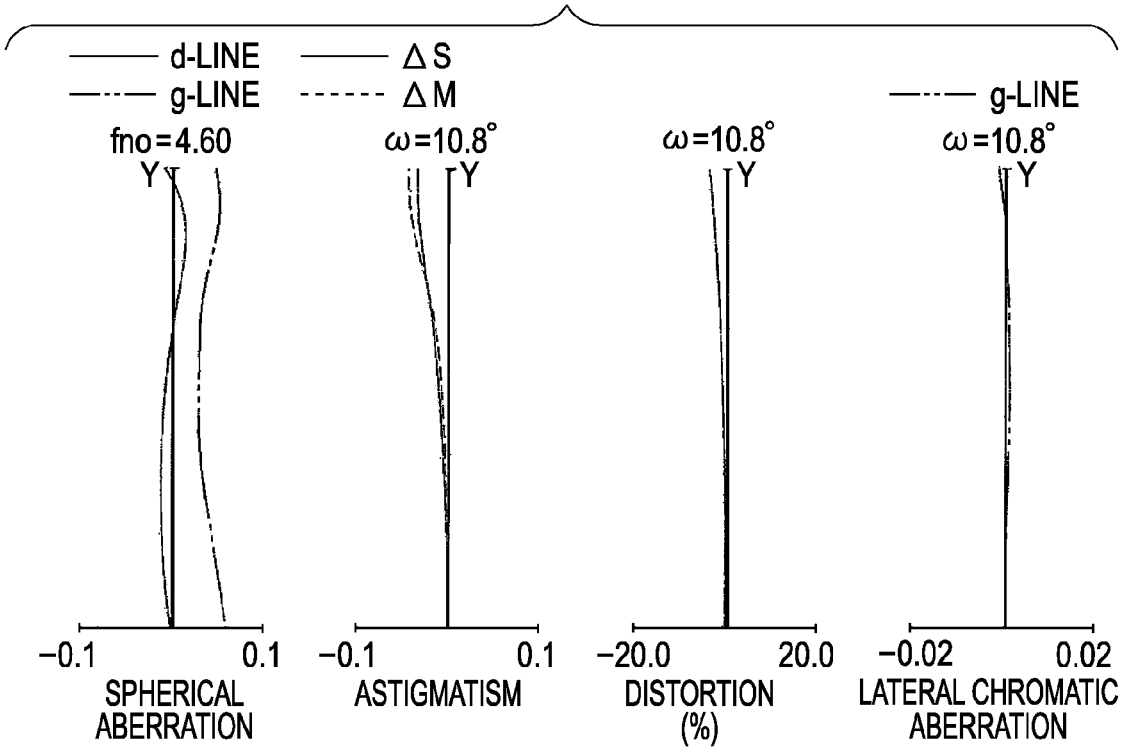
FIG. 12 illustrates aberration at the telephoto end according to the third exemplary embodiment.

FIG. 9 is a cross-sectional view of lens units according to a third exemplary embodiment. FIGS. 10, 11, and 12 illustrate aberration at the wide-angle end, an intermediate zoom position, the telephoto end of the zoom lens system, respectively, according to the third exemplary embodiment. The zoom lens system according to the third exemplary embodiment has a zoom ratio of about 2.8 times and an aperture ratio of about 3.0 to 4.6.

Figure 13:
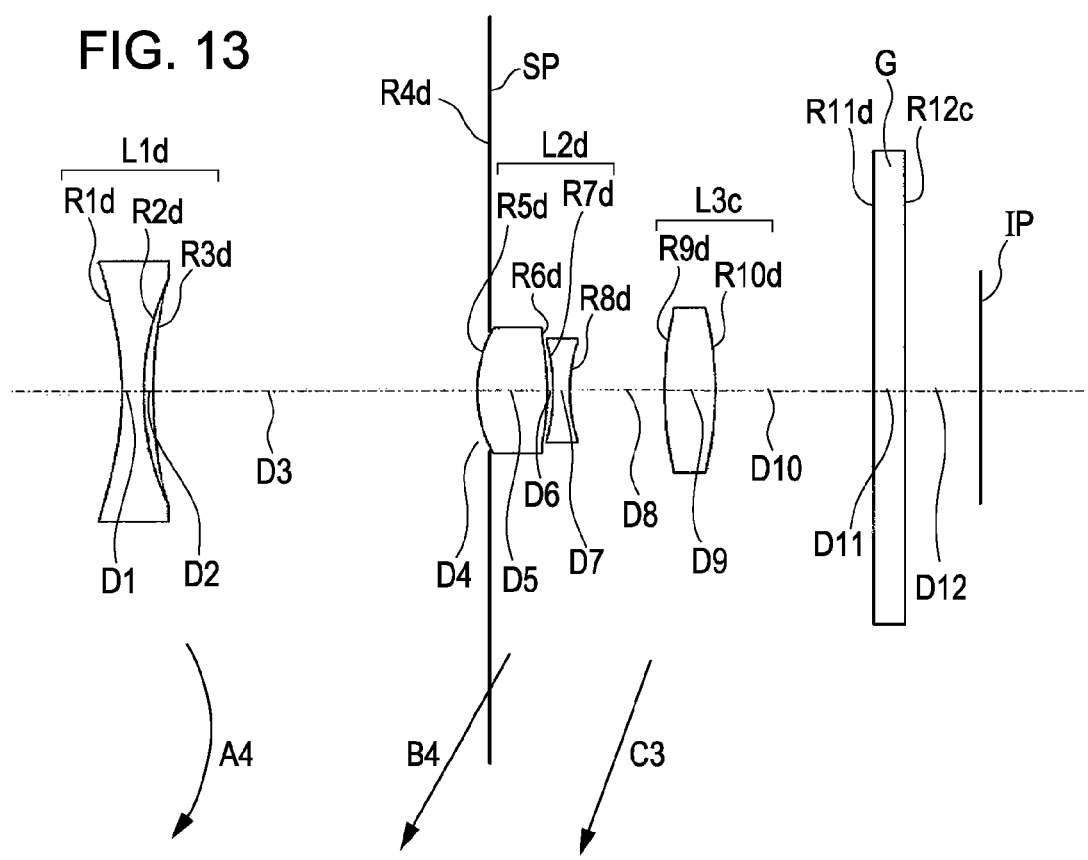
FIG. 13 is a cross-sectional view of lens units according to a fourth exemplary embodiment.
Figure 14:
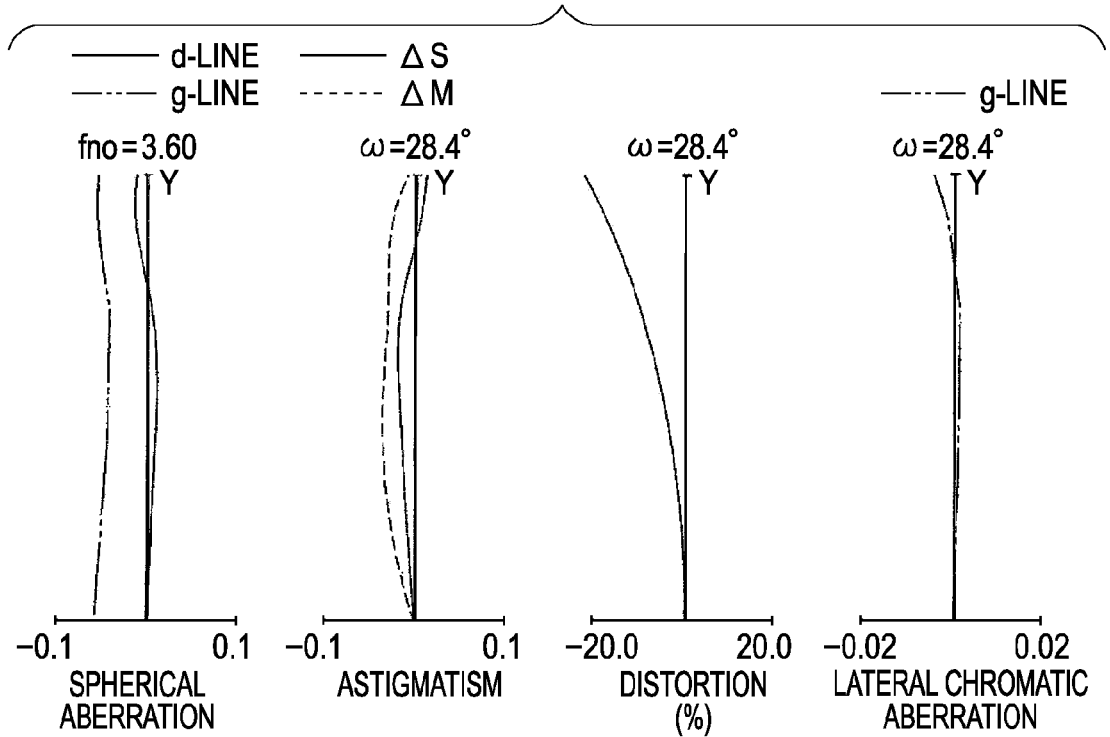
FIG. 14 illustrates aberration at the wide-angle end according to the fourth exemplary embodiment.
Figure 15:
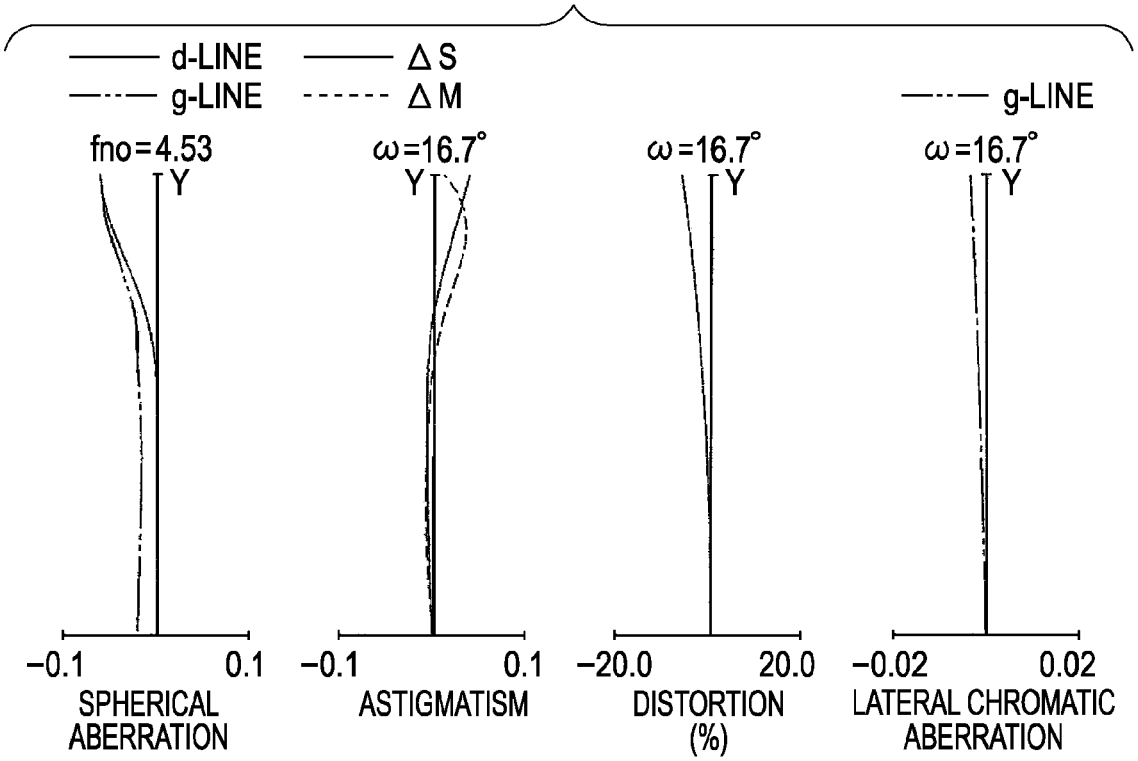
FIG. 15 illustrates aberration at an intermediate zoom position according to the fourth exemplary embodiment.
Figure 16:
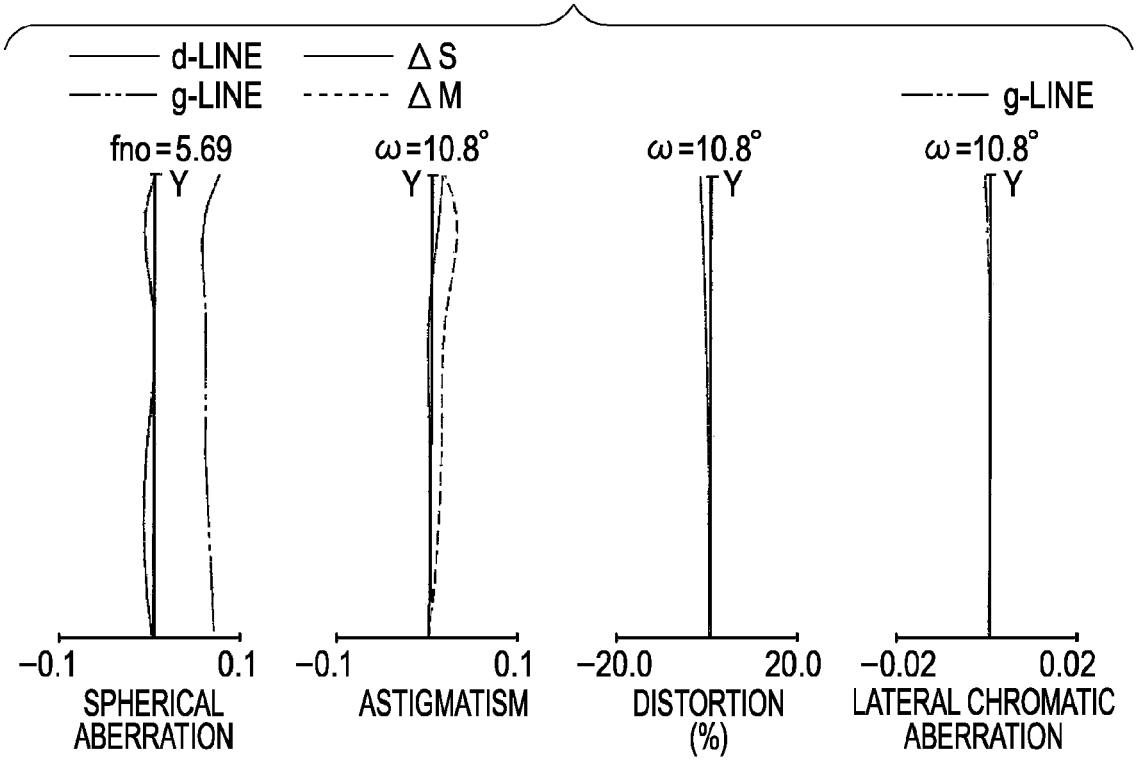
FIG. 16 illustrates aberration at the telephoto end according to the fourth exemplary embodiment.

FIG. 13 is a cross-sectional view of lens units according to a fourth exemplary embodiment. FIGS. 14, 15, and 16 illustrate aberration at the wide-angle end, an intermediate zoom position, the telephoto end of the zoom lens system, respectively, according to the fourth exemplary embodiment. The zoom lens system according to the fourth exemplary embodiment has a zoom ratio of about 2.8 times and an aperture ratio of about 3.6 to 5.7.

Figure 17:
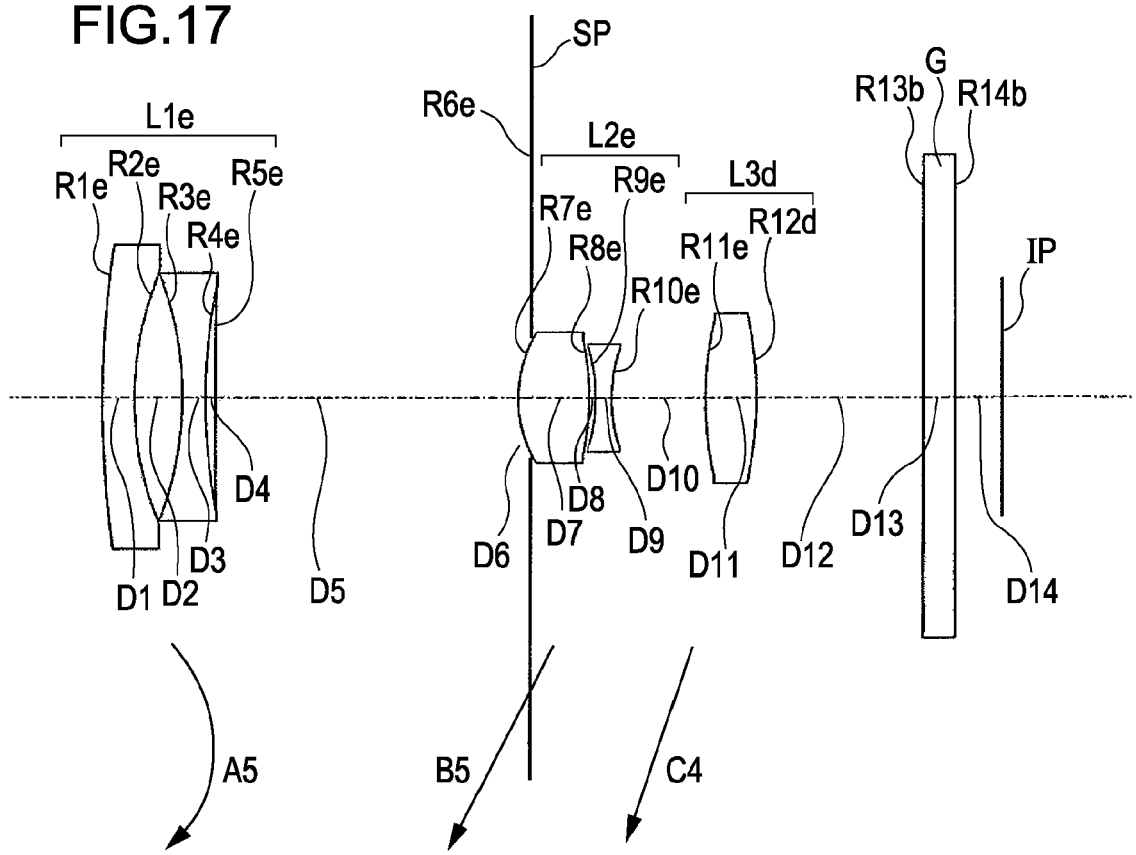
FIG. 17 is a cross-sectional view of lens units according to a fifth exemplary embodiment.
Figure 18:
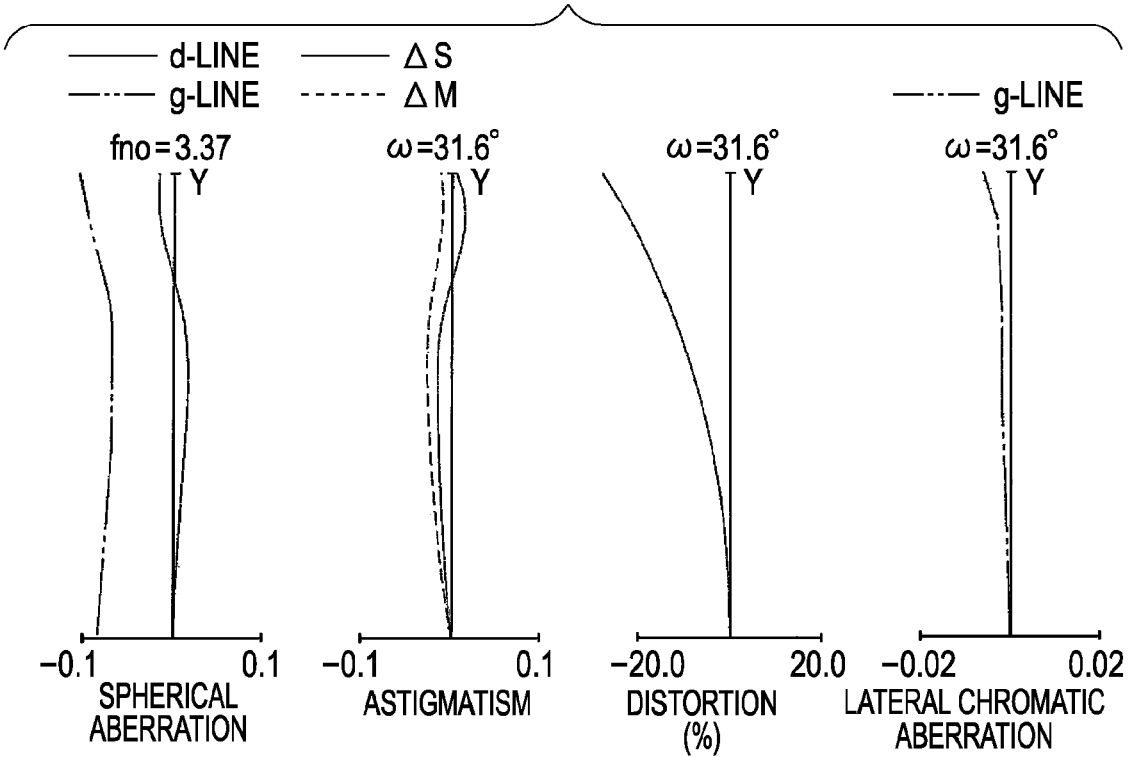
FIG. 18 illustrates aberration at the wide-angle end according to the fifth exemplary embodiment.

FIG. 17 is a cross-sectional view of lens units according to a fifth exemplary embodiment. FIGS. 18, 19, and 20 illustrate aberration at the wide-angle end, an intermediate zoom position, the telephoto end of the zoom lens system, respectively, according to the fifth exemplary embodiment. The zoom lens system according to the fifth exemplary embodiment has a zoom ratio of about 3.0 times and an aperture ratio of about 3.4 to 5.7.

Figure 21:
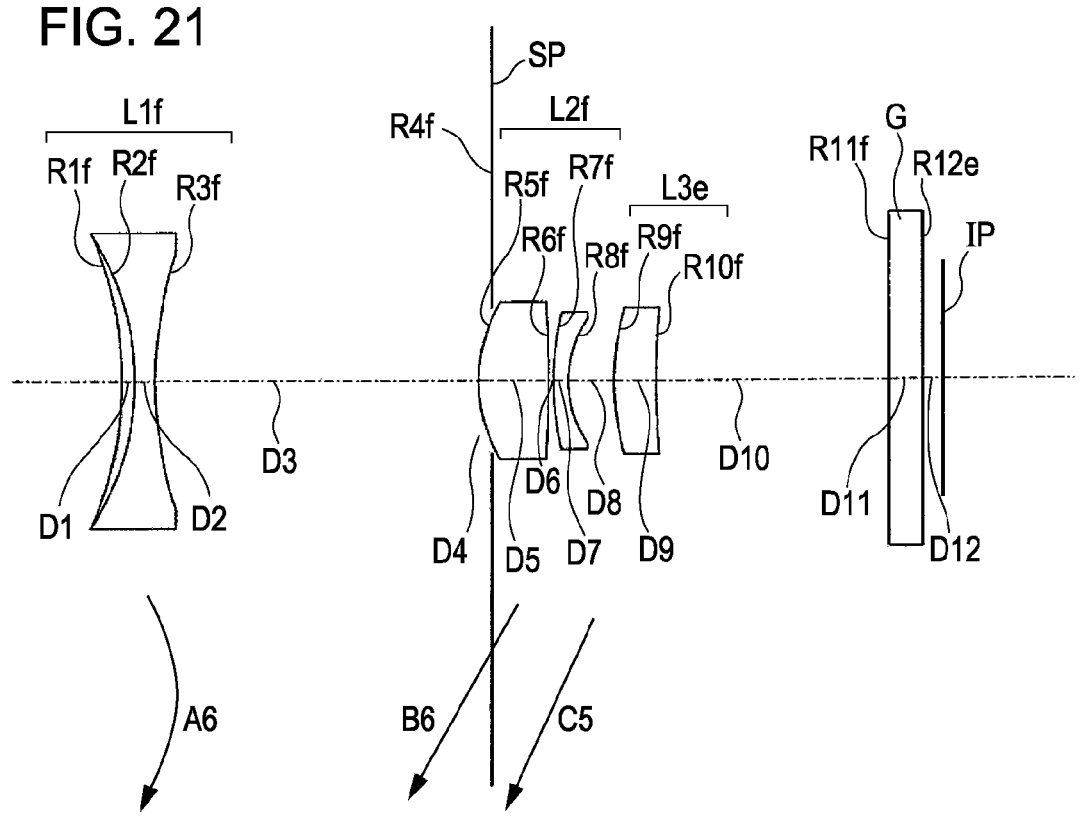
FIG. 21 is a cross-sectional view of lens units according to a sixth exemplary embodiment.
Figure 22:
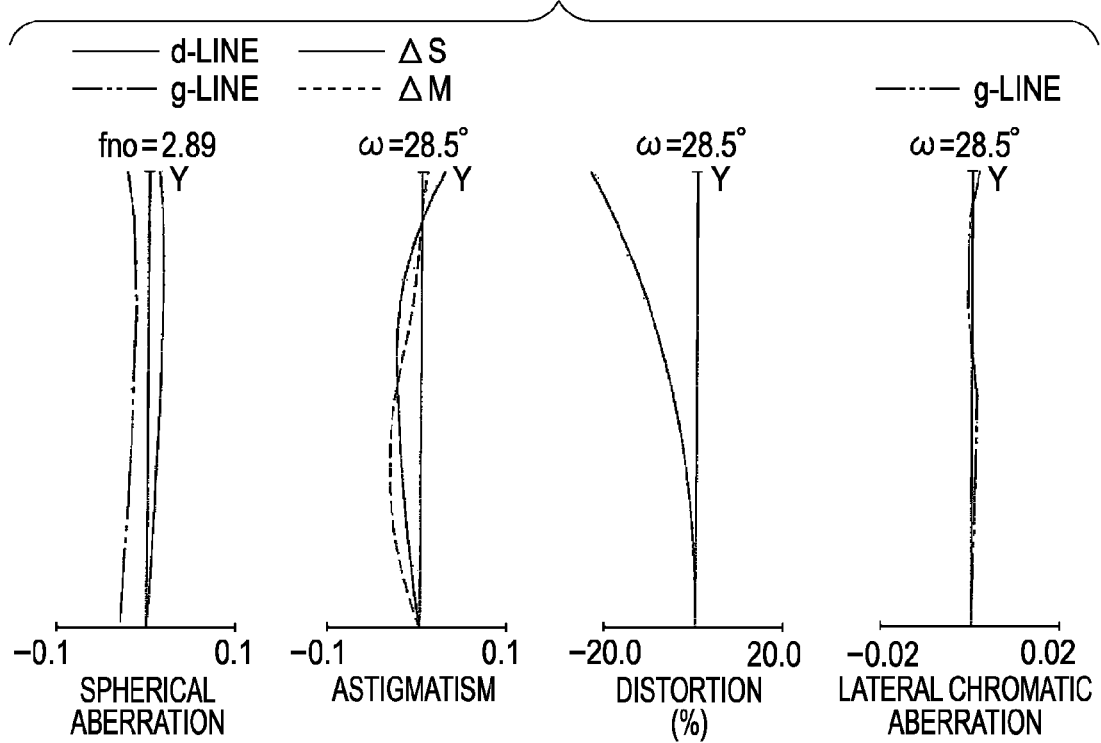
FIG. 22 illustrates aberration at the wide-angle end according to the sixth exemplary embodiment.
Figure 23:
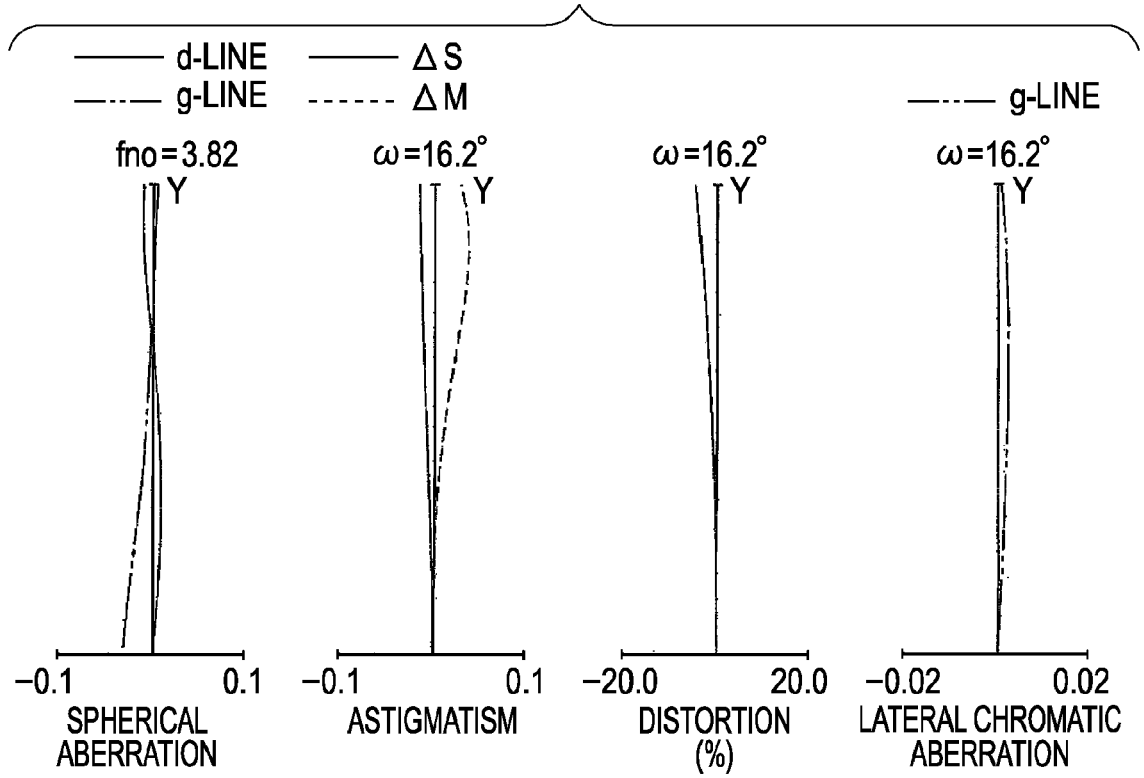
FIG. 23 illustrates aberration at an intermediate zoom position according to the sixth exemplary embodiment.
Figure 24:
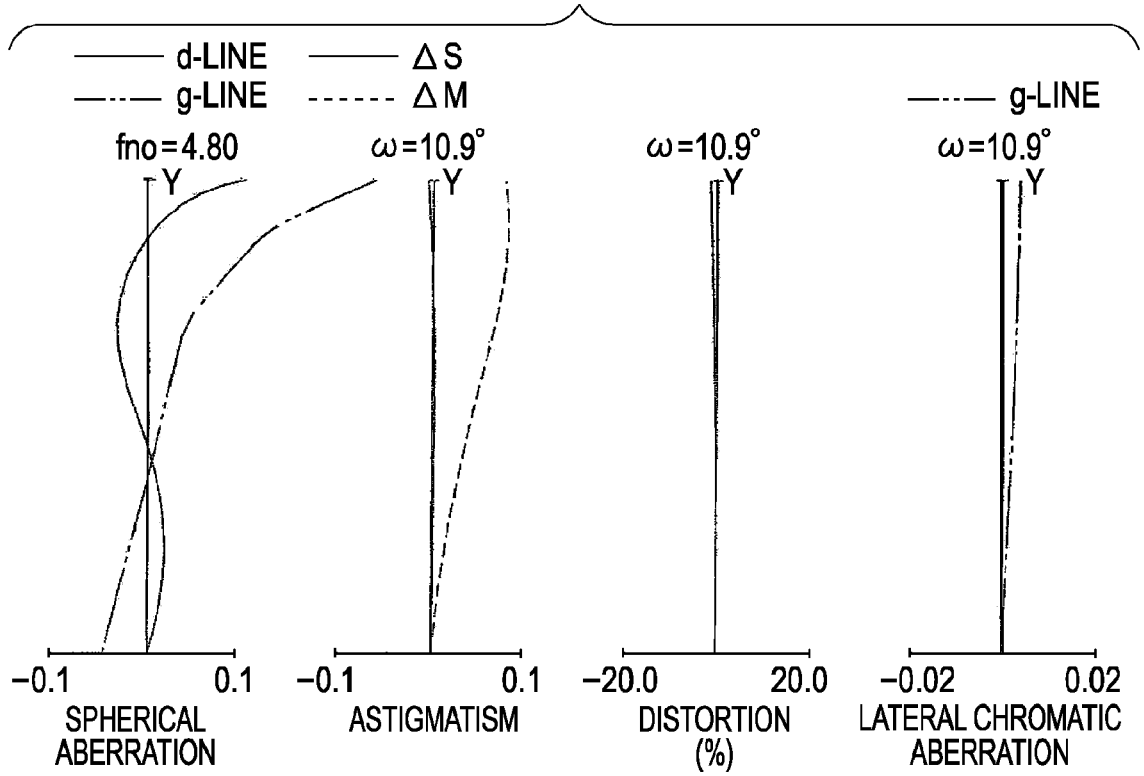
FIG. 24 illustrates aberration at the telephoto end according to the sixth exemplary embodiment.

FIG. 21 is a cross-sectional view of lens units according to a sixth exemplary embodiment. FIGS. 22, 23, and 24 illustrate aberration at the wide-angle end, an intermediate zoom position, the telephoto end of the zoom lens system, respectively, according to the sixth exemplary embodiment. The zoom lens system according to the sixth exemplary embodiment has a zoom ratio of about 2.8 times and an aperture ratio of about 2.9 to 4.8.

Figure 27:
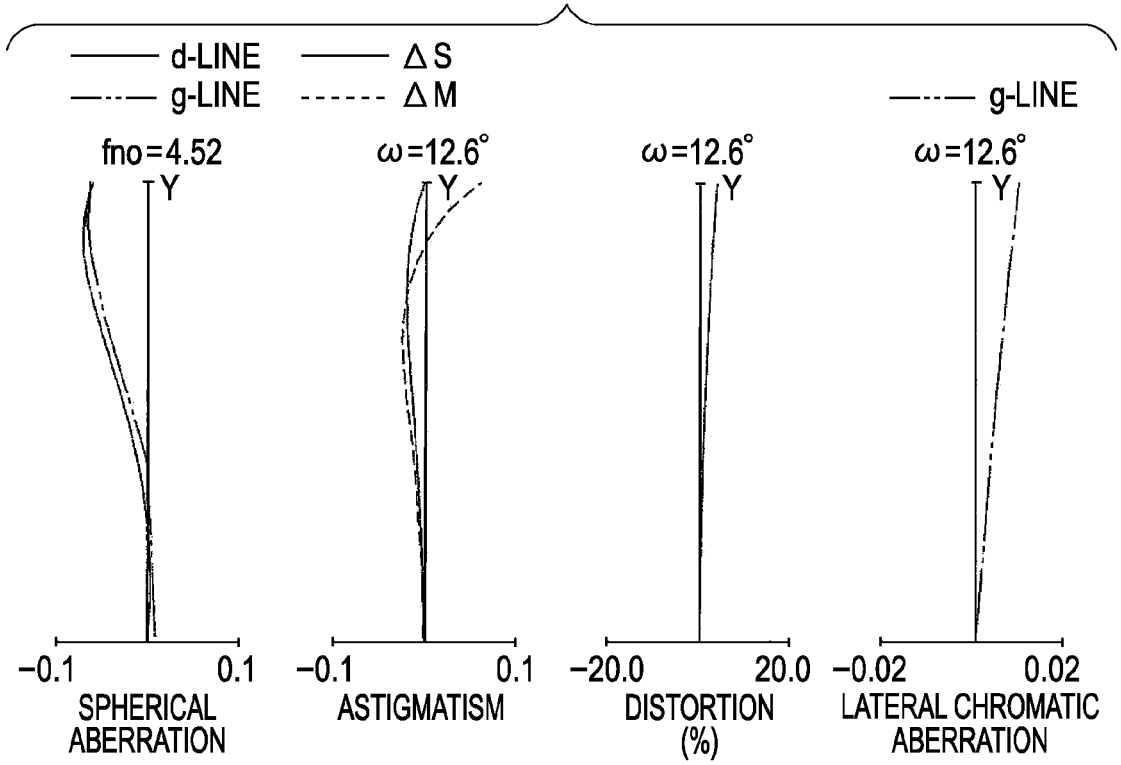
FIG. 27 illustrates aberration at an intermediate zoom position according to the seventh exemplary embodiment.
Figure 28:
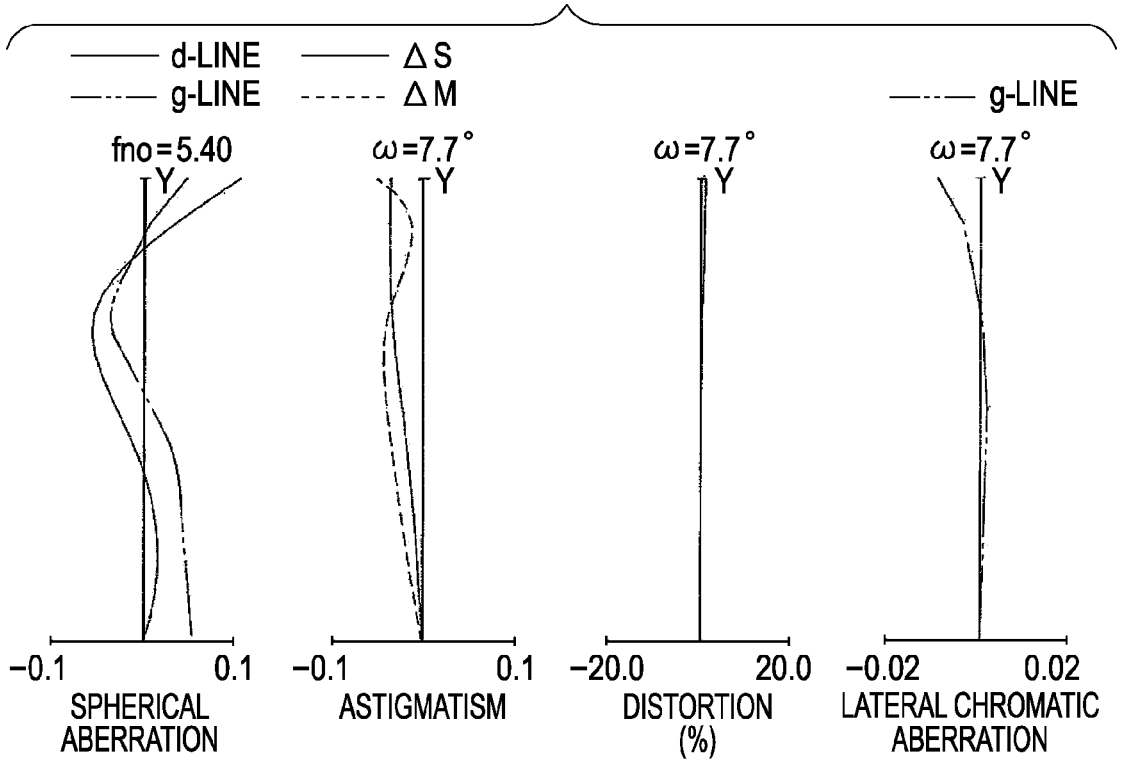
FIG. 28 illustrates aberration at the telephoto end according to the seventh exemplary embodiment.

FIG. 25 is a cross-sectional view of lens units according to a seventh exemplary embodiment. FIGS. 26, 27, and 28 illustrate aberration at the wide-angle end, an intermediate zoom position, the telephoto end of the zoom lens system, respectively, according to the seventh exemplary embodiment. The zoom lens system according to the seventh exemplary embodiment has a zoom ratio of about 4.3 times and an aperture ratio of about 3.2 to 5.4.

Figure 29:
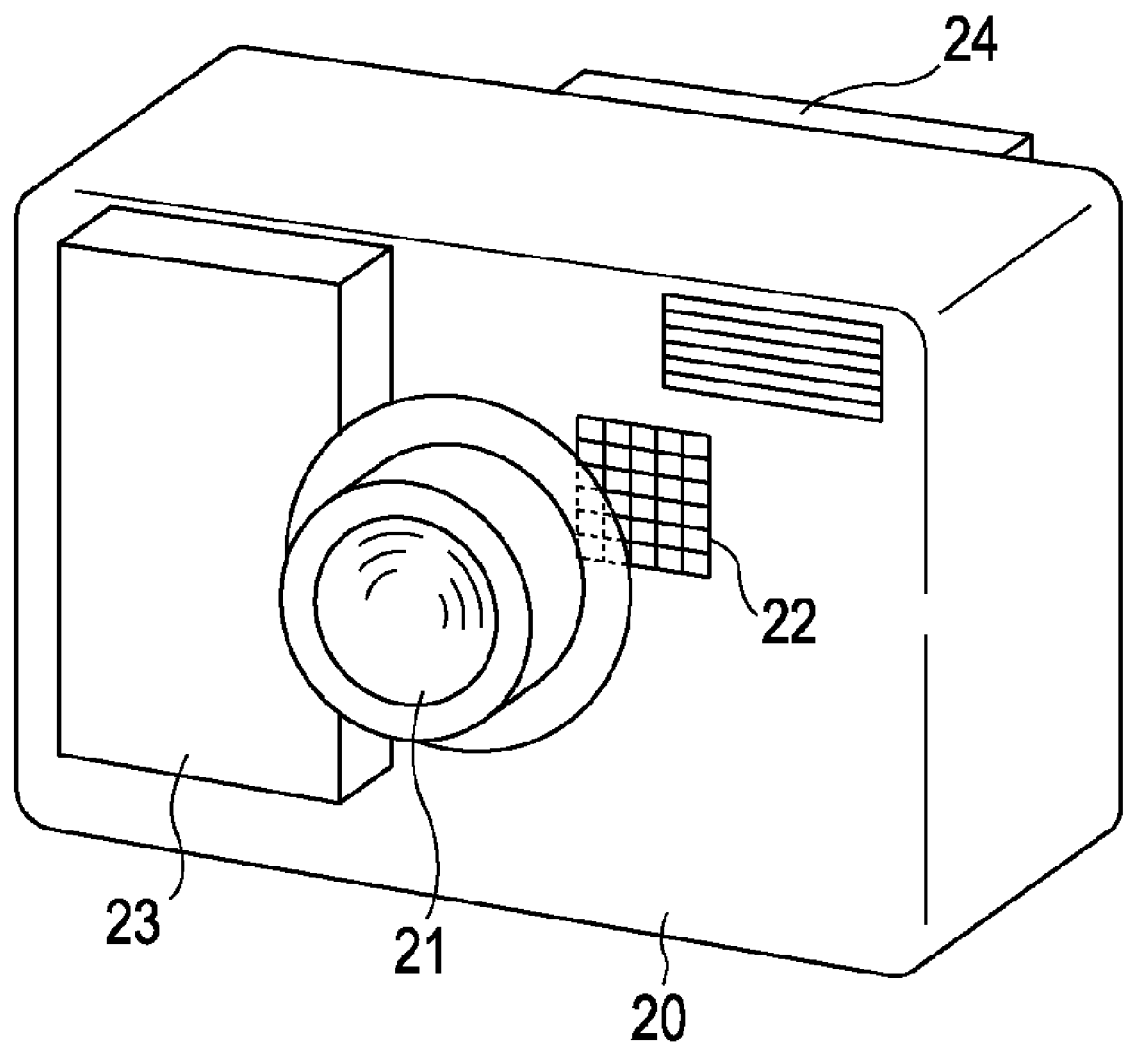
FIG. 29 is a schematic view of the main components of an image-pickup apparatus according to an exemplary embodiment of the present invention.

FIG. 29 is a schematic view of the main components of an image-pickup apparatus according to an exemplary embodiment of the present invention.

The zoom lens system according to each exemplary embodiment is an image-pickup lens, which can be used for an image-pickup apparatus. When the zoom lens system according to each exemplary embodiment can be used as an image-pickup optical system (e.g., for a video camera or a digital still camera), an image of an object is formed on an image-pickup surface (e.g., a solid-state image-pickup element (photoelectric transducer), such as a charge-coupled device (CCD) and a complementary metal-oxide semiconductor (CMOS)).

In the cross-sectional view of the lenses, the left is the object side (front) and the right is the image side (rear) of the lens system. In the cross-sectional view of the lenses, i represents the order of the lens unit counted from the object side to the image side. For example, Li represents the ith lens unit.

An aperture stop SP (F-number stop) limits the on-axis F-number beam. A glass block G equivalent to an optical filter and a face plate is provided. When the zoom lens system can be used as an image-pickup optical system (e.g., in a video camera or a digital still camera), an image plate IP is formed on the image-pickup surface of a solid-state image-pickup element (photoelectric transducer), such as a CCD and a CMOS.

When the zoom lens system can be used as an image-pickup optical system for a camera using silver halide film, the image plate IP is formed on a photosensitive surface equivalent to a film surface.

The drawings illustrating aberration show d-lines d, g-lines g, meridional image planes ΔM, and sagittal image planes ΔS. The lateral chromatic aberration is represented by the g-lines. In the drawings, Fno represents the F-number and ω represents the half angle of view, and the Y-axis in the spherical aberration's graph is entrance pupil radius, the Y-axis in the astigmatism's, distortion's and chromatic aberration of magnification's graphs is image height.

The wide-angle end and the telephoto end according to each exemplary embodiment are zoom positions at both ends of the structural range in which the magnifying lens unit is movable.

In each exemplary embodiment, the distance between a first lens unit L1$a$-$g$ and a second lens unit L2$a$-$g$ change during zooming (for example, at least one of the lens unit L1$a$-$g$ and L2$a$-$g$ moves (A1-A7 and/or B1-B7).

Next, the zoom lens system according to the first exemplary embodiment is described with reference to FIG. 1.

The zoom lens system according to the first exemplary embodiment includes two lens units disposed in order from the object side to the image side: a first lens unit L1$a$ having negative refractive power and a second lens unit L2$a$ having positive refractive power. When zooming is carried out from the wide-angle end to the telephoto end, the first lens unit L1$a$ moves (A1) to the image side, and the second lens unit L2$a$ moves (B1) to the object side.

In the zoom lens system according to the first exemplary embodiment, zooming is carried out mainly by moving the second lens unit L2$a$. The movement of the image point due to zooming is corrected by the movement of the first lens unit L1$a$.

Next, the lens configuration of the zoom lens system according to the first exemplary embodiment is described.

In the first exemplary embodiment, the first lens unit L1$a$ having negative refractive power includes, in order from the object side to the image side (hereinafter, the lens configuration of each lens unit is described in order from the object side to the image side), a negative lens whose surfaces are both concave and a resin layer stacked on the image plane side of the negative lens.

The second lens unit L2$a$ having positive refractive power includes three lenses: a positive lens whose surfaces are both convex, a negative lens whose surfaces are both concave, and a positive meniscus lens whose surface on the object side is convex.

Next, the zooming methods of the zoom lens systems according to the second to sixth exemplary embodiments are described with reference to FIGS. 5, 9, 17, and 21.

The zoom lens systems according to the second to sixth exemplary embodiments includes, from the object side to the image side, three lens units: a first lens unit L1$b$-$f$ having negative refractive power, a second lens unit L2$b$-$f$ having positive refractive power, and a third lens unit L3$a$-$e$ having positive refractive power.

The distances between the lens units change during zooming. More specifically, when zooming from the wide-angle end to the telephoto end, the first lens unit L1$b$-$f$ moves (A2-A6) in a reciprocating manner along a convex trajectory toward the image. The second lens unit L2$b$-$f$ moves (B2-B6) toward the image. The third lens unit L3$a$-$e$ moves (C1) toward the image in the second exemplary embodiment and moves (C2-C5) toward the object in the third to sixth exemplary embodiments.

In the zoom lens system according to the second exemplary embodiment, zooming is carried out mainly by moving the second lens unit L2$b$. The movement of the image point due to zooming is corrected by the reciprocating movement of the first lens unit L1$b$ and movement of the third lens unit L3$a$ to the image side.

In the zoom lens systems according to the third to sixth exemplary embodiments, zooming is carried out mainly by moving (B3-B6) the second lens unit L2$c$-$f$ and the third lens unit L3$b$-$e$. The movement of the image point due to zooming is corrected by the reciprocating movement of the first lens unit L1$c$-$f$.

Next, the lens configuration of the zoom lens systems according to the second to sixth exemplary embodiments are described.

In the second exemplary embodiment shown in FIG. 5, the first lens unit L1$b$ having negative refractive power includes a negative lens whose surfaces are both concave and a resin layer stacked on the image plane side of the negative lens.

The second lens unit L2$b$ having positive refractive power includes three lenses: a positive lens whose surfaces are both convex, a negative lens whose surfaces are both concave, and a positive lens whose surfaces are both convex.

The third lens unit L3a having positive refractive power includes a positive meniscus lens whose surface on the image side is convex.

In the third exemplary embodiment shown in FIG. 9, the first lens unit L1c having negative refractive power includes a negative lens whose surfaces are both concave and a resin layer stacked on the image plane side of the negative lens.

The second lens unit L2c having positive refractive power includes a cemented lens constructed by bonding two lenses: a positive lens whose surfaces are both convex and a negative lens whose surfaces are both concave.

The third lens unit L3b having positive refractive power includes a positive meniscus lens whose surface on the object side is convex.

In the fourth exemplary embodiment shown in FIG. 13, the first lens unit L1d having negative refractive power includes a negative lens whose surfaces are both concave and a resin layer stacked on the image plane side of the negative lens.

The second lens unit L2d having positive refractive power includes two lenses: a positive lens whose surfaces are both convex and a negative lens whose surfaces are both concave.

The third lens unit L3c having positive refractive power includes a positive meniscus lens whose surfaces are both convex.

In the fifth exemplary embodiment shown in FIG. 17, the first lens unit L1e having negative refractive power includes a negative meniscus lens whose surface on the object side is convex, a negative lens whose surfaces are both concave, and a resin layer stacked on the image plane side of the negative lens.

The second lens unit L2e having positive refractive power includes two lenses: a positive lens whose surfaces are both convex and a negative lens whose surfaces are both concave.

The third lens unit L3d having positive refractive power includes a positive meniscus lens whose surfaces are both convex.

In the sixth exemplary embodiment shown in FIG. 21, the first lens unit L1f having negative refractive power includes a negative lens whose surfaces are both concave and a resin layer stacked on the object side of the negative lens.

The second lens unit L2f having positive refractive power includes two lenses: a positive lens whose surfaces are both convex and a negative meniscus lens whose surface on the object side is convex.

The third lens unit L3e having positive refractive power includes a positive meniscus lens whose surface on the object side is convex.

Next, the zooming method of the zoom lens system according to the seventh exemplary embodiment shown in FIG. 25 is described.

The zoom lens system according to the seventh exemplary embodiment shown in FIG. 25 includes, from the object side to the image side, four lens units: the first lens unit L1g having negative refractive power, the second lens unit L2g having positive refractive power, the third lens unit L3f having negative refractive power, and the fourth lens unit L4a having positive refractive power.

The distances between the lens units change during zooming. More specifically, when zooming from the wide-angle end to the telephoto end, the first lens unit L1g moves (A7) in a reciprocating manner along a convex trajectory toward the image. The second lens unit L2g and the third lens unit L3f move (B7 and C6 respectively) toward the object. The fourth lens unit L4a moves (D1) in a reciprocating manner along a convex trajectory toward the object.

In the zoom lens system according to the seventh exemplary embodiment, zooming is carried out mainly by moving the second lens unit L2g and the third lens unit L3f. The movement of the image point due to zooming is corrected by the reciprocating movement of the first lens unit L1g and the fourth lens unit L4a.

Next, the lens configuration of the zoom lens systems according to the seventh exemplary embodiment are described.

In the seventh exemplary embodiment, the first lens unit L1g having negative refractive power includes a negative meniscus lens whose surface on the object side is convex and a resin layer stacked on the image plane side of the negative meniscus lens.

The second lens unit L2g having positive refractive power includes a cemented lens constructed by bonding a negative meniscus lens whose surface on the object side is convex and a positive meniscus lens whose surface on the object side is convex, and a positive lens whose surfaces are both convex.

The third lens unit L3f having negative refractive power includes a cemented lens constructed by bonding together a positive lens whose surfaces are both convex and a negative lens whose surfaces are both concave.

The fourth lens unit L4a having positive refractive power includes a cemented lens constructed by bonding together a positive lens whose surfaces are both convex and a negative meniscus lens whose surface on the object side is convex.

According to the above-described exemplary embodiments, the first lens unit L1a-g includes a compound optical element being constituted of a lens element and a resin layer stacked on the lens element. When the resin layer is formed, for example, with curable resin that is curable by light or heat, typically, a mold can be used to form the resin layer by photopolymerization or thermopolymerization.

Therefore, by forming an aspherical mold in advance, the surface of the lens element opposite to the boundary surface of the lens element can be relatively easily formed as an aspherical surface.

According to the first to fourth exemplary embodiments and the sixth exemplary embodiment, the surface of the lens element opposite to the boundary surface with the resin layer is formed as an aspherical surface. According to the third exemplary embodiment, the boundary surface is also formed as an aspherical surface. By constructing the lens element by applying a known molding method, an aspherical surface can be easily formed.

According to the first to fourth exemplary embodiments and the sixth exemplary embodiment, the FNo (F-number) stop SP that is an aperture stop is interposed between the object-side tip of the lens disposed closest to the object in the second lens unit L2a-d, f and the intersection of the object-side surface of the lens and the periphery of the lens.

In this way, components that interfere with the retraction of the barrel are not interposed between the first lens unit L1a-d, f and the second lens unit L2a-d, f. Accordingly, when the lens barrel is retracted, the distance between the first lens unit L1a-d, f and the second lens unit L2a-d, f can be minimized.

According to the exemplary embodiments, the first lens unit L1a-g includes a compound optical element being constituted of a lens element and a resin layer that has optical performance different from that of the lens and constructed by stacking a resin layer on the light-transmitting surface of the lens element. The first lens unit L1a-g can satisfy the following conditions:

$$20 < |vdg - vdj| \tag{1}$$

$$fg/fj < 0 \tag{2}$$

where fg represents the focal length of the lens element, vdg represents the Abbe number of the lens material, fj represents the focal length of the resin layer, and vdj represents the Abbe number of the resin.

Here, the lens element is an optical element with refractive power, such as a glass lens or a plastic lens, and includes a substrate that can be laminated with resin. The resin, which can be used for laminating the substrate, may be molded in advance so long as the optical performance differs from the substrate.

Expression 1 relates to the difference in the Abbe numbers of the d-lines of the materials of the lens element and the resin layer. When the lower limit defined in Expression 1 is surpassed, the difference in the Abbe numbers is not sufficient. Therefore, chromatic aberration of the first lens unit L1a-g is not well corrected.

Chromatic aberration can be easily corrected by setting the numerical range of Expression 1 as below:

$$25 < |vdg - vdj| \tag{1a}$$

Additionally, the numerical range set by Expression 1a may be set as below:

$$31 < |vdg - vdj| \tag{1b}$$

The exemplary embodiments can satisfy Expression 1b. In this way, the above-described advantages are achieved.

Expression 2 relates to the ratio of the focal distances of the lens element and the resin layer, where the focal distances of the lens element and the resin layer are represented by opposite signs.

When Expression 2 is not satisfied, the refractive powers of the lens element and the resin layer become the same sign, and it becomes difficult to correct chromatic aberration at the compound optical element itself. As a result, it becomes difficult to correct chromatic aberration at the entire first lens unit L1a-g.

According to the exemplary embodiments, the compound optical element included in the first lens unit L1a-g having negative refractive power includes a lens element and a resin layer. The light-receiving surface and the light-emitting surface of the resin layer are both refractive surfaces.

The resin layer as a whole has refractive power. The optical material used to form the resin layer has a relatively great (high) partial variance ratio. In this way, the effect of the chromatic aberration correction is increased.

More specifically, a material that can satisfy Expressions 3 and 4 below can be used:

$$-2.100 \times 10^{-3} \cdot vdj + 0.693 < \theta gF \tag{3}$$

$$0.555 < \theta gF < 0.9 \tag{4}$$

where vdj represents the Abbe number of the resin layer and $\theta gF$ represents the partial variance ratio.

By using a material that can satisfy Expressions 3 and 4, chromatic aberration is well corrected in a wide wavelength band from the g-line to the C-line.

The Abbe number vdj, the partial variance ratio $\theta gF$, and the partial variance ratio $\theta gd$ can be represented as below:

$$vdj = (Nd-1)/(NF-NC)$$

$$\theta gd = (Ng-Nd)/(NF-NC)$$

$$\theta gF = (Ng-NF)/(NF-NC)$$

where, Ng, NF, Nd, and NC represent the indices of refraction of the material for the g-line (435.8 nm), F-line (486.1 nm), d-line (587.6 nm), and C-line (656.3 nm).

Chromatic aberration can be corrected even better by setting the numerical range of Expression 3 as below:

$$-2.100 \times 10^{-3} \cdot vdj + 0.693 < \theta gF < -1.231 \times 10^{3} \cdot vdj + 0.900 \tag{3a}$$

Additionally, the numerical range of Expression 3a may be set as below:

$$-2.100 \times 10^{-3} \cdot vdj + 0.693 < \theta gF < -1.389 \times 10^{-3} \cdot vdj + 0.823 \tag{3b}$$

Additionally, the numerical range of Expression 3b may be set as below:

$$-1.682 \times 10^{-3} \cdot vdj + 0.700 < \theta gF < -1.682 \times 10^{-3} \cdot vdj + 0.756 \tag{3c}$$

Expression 4 is provided to correct chromatic aberration in a wide wavelength band from the g-line to the C-line, similar to Expression 3.

It is difficult to correct chromatic aberration in a wide wavelength band outside that defined by Expression 4. Chromatic aberration can be corrected better by setting Expression 4 as below:

$$0.555 < \theta gF < 0.86 \tag{4a}$$

Chromatic aberration can be corrected better by setting Expression 4a as below:

$$0.555 < \theta gF < 0.80 \tag{4b}$$

For chromatic aberration correction, it is more useful if the resin material satisfies Expression 5 and 6 below:

$$-2.407 \times 10^{-3} \cdot vdj + 1.420 < \theta gd \tag{5}$$

$$1.255 < \theta gd < 1.67 \tag{6}$$

When the material can satisfy Expressions 5 and 6, chromatic aberration between the g-line and the d-line can be well corrected. In this way, chromatic aberration can be corrected even more finely and easily in the wavelength band between the g-line and the C-line.

Chromatic aberration can be corrected better by setting the numerical range of Expression 5 as below:

$$-2.407 \times 10^{-3} \cdot vdj + 1.420 < \theta gd < -1.152 \times 10^{-3} \cdot vdj + 1.651 \tag{5a}$$

It is more useful if the numerical range of Expression 5a is set as below:

$$-2.407 \times 10^{-3} \cdot vdj + 1.420 < \theta gd < -1.865 \times 10^{-3} \cdot vdj + 1.572 \tag{5b}$$

It is even more desirable that the numerical range of Expression 5b is set as below:

$$-2.076 \times 10^{-3} \cdot vdj + 1.426 < \theta gd < -2.076 \times 10^{-3} \cdot vdj + 1.512 \tag{5c}$$

Chromatic aberration can be corrected better by setting the numerical range of Expression 6 as below:

$$1.255 < \theta gd < 1.61 \tag{6a}$$

It is more useful if the numerical range of Expression 6a is set as below:

$$1.255 < \theta gd < 1.54 \tag{6b}$$

For satisfactory chromatic aberration correction, it is more useful if the Abbe number vdj of the resin layer can satisfy the condition defined below:

$$vdj < 55 \tag{7}$$

Chromatic aberration can be corrected better by setting the numerical range of Expression 7 as below:

$$\nu dj < 45 \quad (7a)$$

It is more useful if the numerical range of Expression 7a is set as below:

$$\nu dj < 30 \quad (7b)$$

As specific examples of optical materials that satisfy Expressions 3 and 4, the following resins are known to satisfy Expressions 3 and 4:

UV curable resin (Nd=1.635, νd=22.7, θgF=0.69) and
N-polyvinyl carbazole (Nd=1.696, νd=17.7, θgF=0.69)

The resin is not limited so long as Expressions 3 and 4 are satisfied.

It is more useful if the exemplary embodiments satisfy the condition defined by the expression below:

$$0 < fw/fj < 1.0 \quad (8)$$

where fj represents the focal length of the resin layer included in the first lens unit L1a-g having negative refractive power and fw represents the focal length of the entire zoom lens system at the wide-angle end.

When the lower limit defined by Expression 8 is surpassed, the focal distance of the resin layer will be negative. As a result, if becomes difficult to correct chromatic aberration between the resin layer and the lens element that provides the main refractive power and that is included in the first lens unit L1a-g having negative refractive power. This is less useful since it becomes difficult to correct chromatic aberration in the entire first lens unit L1a-g.

When the upper limit of Expression 8 is exceeded, the refractive power of the resin layer is increased. At the same time, the refractive power of the lens element also in relatively increased. Therefore, in particular, it becomes difficult to correct transverse aberration.

Aberration can be corrected better by setting the numerical range of Expression 8 as below:

$$0 < fw/fj < 0.6 \quad (8a)$$

It is more useful if the numerical range of Expression 8a is set as below:

$$0 < fw/fj < 0.4 \quad (8b)$$

It is more useful if the exemplary embodiments satisfy the condition defined by the expression below:

$$0.3 < fg/fa < 1.0 \quad (9)$$

where fa represent the focal length of the compound optical element included in the first lens unit L1a-g having negative refractive power.

When the upper limit of Expression 9 is exceeded, the focal length of the lens element becomes longer than the focal length of the entire compound optical element. As a result, the positive refractive power of the resin layer is decreased. This is less useful because aberration correction in the entire compound optical element becomes difficult.

When the lower limit defined by Expression 9 is surpassed, the positive refractive power of the resin layer becomes relatively strong. This can be more useful for correcting chromatic aberration, but is less useful for correcting transverse aberration.

Aberration can be corrected better by setting the numerical range of Expression 9 as below:

$$0.4 < fg/fa < 1.0 \quad (9a)$$

It is more useful if the numerical range of Expression 9a is set as below:

$$0.5 < fg/fa < 0.9 \quad (9b)$$

According to the exemplary embodiments, among the various types of aberration, distortion can be corrected by employing, for example, a known electric aberration correction method.

The elements according to the exemplary embodiments are set appropriately as described above. In this way, a retractable zoom lens system including a solid-state image-pickup element is provided. Moreover, according to the exemplary embodiments, a zoom lens system including a small number of lenses and having excellent optical performance in which various types of aberration, including chromatic aberration, is well corrected.

According to the exemplary embodiments, by effectively using lenses with aspherical surfaces for the lens units, good optical performance is achieved, and, thus, transverse aberration, or in particular, astigmatism and spherical aberration that occurs when the focal ratio is increased, is well corrected.

Next, a video camera (optical apparatus) including the zoom lens system according to an exemplary embodiment of the present invention as an image-pickup optical system will be described with reference to FIG. 29.

As shown in FIG. 29, the video camera includes a video camera main body 20, an image-pickup optical system 21 including the zoom lens system according to an exemplary embodiment of the present invention, and an image-pickup element 22, such as a CCD, that is configured to receive an image of an object captured by the image-pickup optical system 21.

The video camera also includes a recoding unit 23 configured to record an image of an object captured by the image-pickup element 22 and a viewfinder 24 configured to observe the image of an object display on a display element, not shown in the drawing.

The display element includes a liquid crystal panel and displays the image of an object formed on the image-pickup element 22.

Accordingly, by employing the zoom lens system according to an exemplary embodiment of the present invention to an optical apparatus, such as a video camera, a small optical apparatus with excellent optical performance can be provided.

Next, numerical examples of the present invention are provided below. In the numerical examples, i represents the number of lens surfaces counted from the object side, Ri represent the radius of curvature of the ith surface, Di represents the thickness of the lenses and the air gap between ith surface and the (i+1)th surface, Ni represents the index of refraction with respect to the d-line, and νi represents Abbe number of the d-line.

The two surfaces closest to the image is constituted of glass material, such as a face plate. The aspherical coefficient is represented by k, B, C, D, and E.

The shape of an aspherical surface is represented as below:

$$x = (h^2/R)/[1+\{1-(h/k)(h/R)^2\}^{1/2}]+B \cdot h^4+C h^6+Dh^8+Eh^{10}$$

where x represents the displacement in the direction of the optical axis at a height h from the optical axis, with reference to the surface apex, and R represents the index of curvature.

Moreover, "e-0x" is equivalent to "×10$^{-x}$," f represents the focal length, Fno represents an F-number, and ω represents the half angle of view.

The relationship between the above-described expressions and the numerical examples is shown in Table 1.

D4 in the first, second, fourth, and sixth numerical examples and D6 in the fifth numerical example are negative values because, when counting the aperture stop SP and the first lens in the second lens unit L2a-g from the object side, the aperture stop SP is counted first, and then the first lens in the second lens unit L2a-g is counted next.

FIRST NUMERICAL EXAMPLE f=6.504~12.999 Fno=3.00~4.00 2ω=57.3°~30.5°
R 1a=−21.588 D 1=0.60 N 1=1.487490 vd 1=70.2
R 2a=11.435 D 2=0.25 N 2=1.63555 vd 2=22.7
R 3a=13.243 D 3=variable
R 4a=aperture stop D 4=−0.40
R 5a=3.785 D 5=2.20 N 3=1.834000 vd 3=37.2
R 6a=−23.328 D 6=0.14
R 7a=−16.452 D 7=0.50 N 4=1.922860 vd 4=18.9
R 8a=5.442 D 8=1.73
R 9a=5.254 D 9=1.30 N 5=1.805181 vd 5=25.4
R10a=8.541 D10=variable
R11a=∞ D11=1.00 N 6=1.516330 vd 6=64.1
R12a=∞

TABLE 1

|     | f     |       |        |
| --- | ----- | ----- | ------ |
| D   | 6.504 | 9.751 | 12.999 |
| D3  | 10.48 | 4.05  | 0.83   |
| D10 | 4.09  | 5.47  | 6.84   |

Aspherical Coefficient
R1a k=−1.09299e+01 B=−1.74216e−03 C=7.57292e−05
  D=−8.76821e−07
E=−7.61194e−09
R3a k=−2.67276e+01 B=1.57785e−04 C=−3.10022e−05
  D=4.42658e−06
E=−1.12445e−07
R5a k=−2.25504e−01 B=4.53792e−04 C=1.43541e−04
R6a k=−1.01152e+01 B=3.05865e−03 C=−1.35438e−04
R7a k=−6.23345e+00 B=2.53902e−03 C=3.41808e−05
R8a k=−5.55212e−01 B=1.96481e−03 C=1.28391e−03
R9a k=−2.04670e+00 B=−1.94383e−03 C=−1.43317e−04
R10a k=−4.41466e−01 B=−1.65084e−03 C=−1.94424e−04

SECOND NUMERICAL EXAMPLE f=6.202~18.599 Fno=3.00~5.60 2ω=59.6°~21.6°
R 1b=−15.292 D 1=0.60 N 1=1.487490 vd 1=70.2
R 2b=6.543 D 2=0.40 N 2=1.62520 vd 2=25.24
R 3b=9.024 D 3=variable
R 4b=aperture stop D 4=−0.40
R 5b=4.675 D 5=2.20 N 3=1.806098 vd 3=40.9
R 6b=−15.585 D 6=0.45
R 7b=−11.052 D 7=0.50 N 4=1.805181 vd 4=25.4
R 8b=4.220 D 8=1.56
R 9b=9.989 D 9=1.30 N 5=1.804000 vd 5=46.6
R10b=−23.446 D10=variable
R11b=−378.728 D11=1.30 N 6=1.583126 vd 6=59.4
R12b=−13.281 D12=variable
R13a=∞ D13=1.00 N 7=1.516330 vd 7=64.1
R14a=∞

TABLE 2

|     | f     |        |        |
| --- | ----- | ------ | ------ |
| D   | 6.202 | 11.897 | 18.599 |
| D3  | 11.88 | 5.13   | 2.47   |
| D10 | 4.18  | 10.86  | 17.70  |
| D12 | 3.67  | 2.43   | 1.03   |

Aspherical Coefficient
R1b k=−6.88264e+00 B=−9.46285e−05 C=2.66126e−06
  D=1.32434e−07
E=−9.69671e−10
R3b k=−3.86017e+00 B=4.64420e−04 C=−6.43371e−06
  D=4.69463e−07
E=1.42598e−08
R5b k=−2.12422e−02 B=−4.01373e−04 C=3.61898e−06
R6b k=−4.26286e+00 B=3.32312e−04 C=1.11033e−05
R11b k=−6.00735e+05 B=9.53671e−04 C=1.75110e−05
R12b k=−2.74745e+01 B=9.41336e−04 C=6.17511e−05

THIRD NUMERICAL EXAMPLE f=6.590~18.640 Fno=2.96~4.60 2ω=56.6°~21.6°
R 1c=−9.362 D 1=0.60 N 1=1.48749 vd 1=70.2
R 2c=13.690 D 2=0.35 N 2=1.69591 vd 2=17.7
R 3c=20.719 D 3=variable
R 4c=aperture stop D 4=0.15
R 5c=5.061 D 5=2.50 N 3=1.76200 vd 3=40.1
R 6c=−2.375 D 6=0.50 N 4=1.69895 vd 4=30.1
R 7c=7.763 D 7=variable
R 8c=10.445 D 8=1.40 N 5=1.77250 vd 5=49.6
R 9c=16.994 D 9=variable
R10c=∞ D10=1.00 N 6=1.51633 vd 6=64.1
R11c=∞

TABLE 3

|    | f     |        |        |
| -- | ----- | ------ | ------ |
| D  | 6.590 | 13.155 | 18.640 |
| D3 | 13.47 | 3.52   | 0.89   |
| D7 | 8.15  | 8.91   | 11.70  |
| D9 | 0.92  | 4.79   | 6.64   |

Aspherical Coefficient
R1c k=3.89310e−01 B=4.37755e−04 C=1.92683e−06
  D=6.33555e−09
R2c k=−3.79455e+00 B=3.26079e−04 C=−1.97275e−06
R3c k=−2.67610e−01 B=1.64690e−04 C=4.35733e−06
R5c k=1.80938e−02 B=1.20823e−05 C=2.40546e−05
R6c k=−2.46679e+00 B=−3.36766e−03 C=3.18762e−04
R7c k=1.69997e+00 B=1.40072e−03 C=2.56727e−04
R8c k=0.00000e+00 B=8.51454e−05 C=3.35662e−07

FOURTH NUMERICAL EXAMPLE f=6.593~18.639 Fno=3.60~5.69 2ω=56.8°~21.6°
R 1d=−11.250 D 1=0.70 N 1=1.589130 vd 1=61.3
R 2d=8.711 D 2=0.30 N 2=1.63555 vd 2=22.7
R 3d=14.632 D 3=variable
R 4d=aperture stop D 4=−0.40
R 5d=4.189 D 5=2.20 N 3=1.806098 vd 3=40.9

R 6d=−8.763 D 6=0.20
R 7d=−6.173 D 7=0.50 N 4=1.761821 vd 4=26.5
R 8d=5.440 D 8=variable
R 9d=11.707 D 9=1.60 N 5=1.487490 vd 5=70.2
R10d=−11.208 D10=variable
R11d=∞ D11=1.00 N 6=1.516330 vd 6=64.1
R12c=∞

TABLE 4

|  | f | | |
|---|---|---|---|
| D | 6.593 | 11.871 | 18.639 |
| D3 | 10.64 | 4.04 | 0.80 |
| D8 | 2.99 | 4.57 | 4.49 |
| D10 | 5.04 | 9.43 | 15.47 |

Aspherical Coefficient
R1d k=−8.21035e−01 B=−3.40069e−04 C=4.04753e−05
D=5.56591e−08
E=−4.84525e−08
R3d k=−2.75130e+00 B=−3.14187e−04 C=3.29725e−05
D=3.51804e−06
E=−2.12987e−07
R5d k=−2.54107e+00 B=4.61960e−03 C=4.24270e−05
R8d k=−7.94587e+00 B=1.01773e−02 C=5.73115e−05

FIFTH NUMERICAL EXAMPLE f=5.802~17.399 Fno=3.38~5.71 2ω=63.1°~23.2°
R 1e=32.162 D 1=1.00 N 1=1.772499 vd 1=49.6
R 2e=11.066 D 2=1.50
R 3e=−10.517 D 3=0.70 N 2=1.603112 vd 2=60.6
R 4e=17.642 D 4=0.30 N 3=1.63555 vd 3=22.7
R 5e=179.133 D 5=variable
R 6e=aperture stop D 6=−0.40
R 7e=3.985 D 7=2.20 N 4=1.806098 vd 4=40.9
R 8e=−8.286 D 8=0.20
R 9e=−5.713 D 9=0.50 N 5=1.761821 vd 5=26.5
R10e=5.494 D10=variable
R11e=10.529 D11=1.60 N 6=1.487490 vd 6=70.2
R12d=−12.192 D12=variable
R13b=∞ D13=1.00 N 7=1.516330 vd 7=64.1
R14b=∞

TABLE 5

|  | f | | |
|---|---|---|---|
| D | 5.802 | 11.227 | 17.399 |
| D5 | 9.81 | 3.33 | 0.80 |
| D10 | 2.92 | 3.61 | 3.49 |
| D12 | 5.20 | 10.06 | 15.76 |

Aspherical Coefficient
R2e k=3.96580e+00 B=−4.00193e−05 C=1.20418e−07
D=−2.21768e−08
E=−1.12285e−07
R5e k=−2.50407e+02 B=−3.61469e−04 C=5.56594e−06
D=2.71438e−06
E=−2.85224e−08
R7e k=−1.92195e+00 B=4.11935e−03 C=1.30544e−04
R10e k=−7.80820e+00 B=1.06997e−02 C=2.81136e−04

SIXTH NUMERICAL EXAMPLE f=6.550~18.510 Fno=2.89~4.80 2ω=56.9°~21.7°
R1f=−15.720 D 1=0.40 N 1=1.63555 vd 1=22.7
R 2f=−8.048 D 2=0.60 N 2=1.516330 vd 2=64.1
R 3f=8.663 D 3=variable
R 4f=aperture stop D 4=−0.40
R 5f=4.254 D 5=2.09 N 3=1.693500 vd 3=53.2
R 6f=−31.953 D 6=0.15
R 7f=8.188 D 7=0.45 N 4=1.846660 vd 4=23.9
R 8f=3.356 D 8=variable
R 9f=7.668 D 9=1.28 N 5=1.772499 vd 5=49.6
R10f=30.059 D10=variable
R11f=∞ D11=1.00 N 6=1.516330 vd 6=64.1
R12e=∞

TABLE 6

|  | f | | |
|---|---|---|---|
| D | 6.550 | 12.223 | 18.510 |
| D3 | 10.08 | 3.71 | 1.05 |
| D8 | 1.36 | 2.32 | 2.60 |
| D10 | 6.98 | 10.77 | 15.25 |

Aspherical Coefficient
R1f k=0.00000e+00 B=−2.32379e−03 C=1.50373e−04
D=−4.12838e−06
E=3.56245e−08
R3f k=−2.82525e+00 B=−2.68319e−03 C=1.87838e−04
D=−1.84092e−06
E=−1.04944e−07
R5f k=−2.86224e−01 B=−1.03668e−03 C=06
D=−8.95721e−06
E=5.53097e−07
R8f k=−1.64548e+00 B=5.31934e−03 C=1.75499e−04
D=−3.86910e−05
E=4.42096e−06
R9f k=0.00000e+00 B=3.17186e−04 C=9.87633e−05
D=−1.80790e−05
E=1.33634e−06
R10f k=1.42696e+02 B=−2.36932e−04 C=−1.34210e−05
D=5.56158e−07
E=−2.79996e−06

SEVENTH NUMERICAL EXAMPLE f=6.045~26.277 Fno=3.19~5.40 2ω=61.2°~15.5°
R 1g=22.139 D 1=1.20 N 1=1.772499 vd 1=49.6
R 2g=6.419 D 2=0.50 N 2=1.63555 vd 2=22.7
R 3g=7.404 D 3=variable
R 4g=10.985 D 4=0.60 N 3=1.698947 vd 3=30.1
R 5g=7.072 D 5=2.20 N 4=1.772499 vd 4=49.6
R 6g=23.462 D 6=0.15
R 7g=9.977 D 7=1.50 N 5=1.772499 vd 5=49.6
R 8g=−83.931 D 8=variable
R 9g=aperture stop D 9=0.10
R10g=3.040 D10=1.30 N 6=1.487490 vd 6=70.2
R11g=−9.597 D11=0.50 N 7=2.003300 vd 7=28.3
R12f=3.369 D12=variable
R13c=23.671 D13=1.90 N 8=1.846660 vd 8=23.9
R14c=−10.010 D14=0.50 N 9=1.487490 vd 9=70.2
R15=−118.944 D15=variable
R16=∞ D16=1.00 N 10=1.516330 vd 10=64.1
R17=∞

TABLE 7

| | f | | |
|---|---|---|---|
| D | 6.045 | 15.926 | 26.277 |
| D3 | 20.14 | 5.17 | 2.17 |
| D8 | 2.31 | 4.08 | 6.30 |
| D12 | 1.47 | 2.57 | 8.15 |
| D15 | 2.00 | 4.90 | 2.92 |

Aspherical Coefficient
R3g k=−1.44359e+00 B=4.06307e−04 C=3.43001e−06
R7g k=−9.15204e+00 B=9.37167e−04 C=−4.55944e−05
R8g k=5.11894e+02 B=−1.84045e−04 C=−1.08559e−05
R13c k=2.16556e+01 B=−7.56985e−05 C=−1.00981e−05

TABLE 8

| Expression | | Lower Limit | Upper Limit | 1st Embodiment | 2nd Embodiment | 3rd Embodiment | 4th Embodiment | 5th Embodiment | 6th Embodiment | 7th Embodiment |
|---|---|---|---|---|---|---|---|---|---|---|
| | νdg | | | 70.2 | 70.2 | 70.2 | 61.3 | 60.6 | 64.1 | 49.6 |
| 7 | νdj | | | 22.7 | 25.3 | 17.7 | 22.7 | 22.7 | 22.7 | 22.7 |
| 1 | \|νdg − νdj\| | 20 | | 47.5 | 44.9 | 52.6 | 38.6 | 37.9 | 41.4 | 26.9 |
| | fg | | | −15.243 | −9.316 | −11.309 | −8.226 | −10.824 | −7.982 | −12.106 |
| | fj | | | 125.030 | 35.848 | 56.829 | 33.212 | 30.769 | 25.430 | 63.446 |
| 2 | fg/fj | | 0 | −0.122 | −0.260 | −0.199 | −0.248 | −0.352 | −0.314 | −0.191 |
| | fw | | | 6.504 | 6.202 | 6.590 | 6.593 | 5.802 | 6.550 | 6.045 |
| | fj | | | 125.030 | 35.848 | 56.829 | 33.212 | 30.769 | 25.430 | 63.446 |
| 8 | fw/fj | 0.0 | 1.0 | 0.052 | 0.173 | 0.116 | 0.199 | 0.189 | 0.258 | 0.095 |
| | fg | | | −15.243 | −9.316 | −11.309 | −8.226 | −10.824 | −7.982 | −12.106 |
| | fa | | | −17.238 | −12.358 | −14.070 | −10.902 | −16.910 | −11.593 | −14.413 |
| 9 | fg/fa | 0.3 | 1.0 | 0.884 | 0.754 | 0.804 | 0.755 | 0.640 | 0.689 | 0.840 |
| 4 | θgF | 0.555 | 0.9 | 0.689 | 0.628 | 0.686 | 0.689 | 0.689 | 0.689 | 0.689 |
| 6 | θgd | 1.255 | 1.67 | 1.422 | 1.348 | 1.416 | 1.422 | 1.422 | 1.422 | 1.422 |

While the present invention has been described with reference to exemplary embodiments, it is to be understood that the invention is not limited to the discussed exemplary embodiments. The scope of the following claims is to be accorded the broadest interpretation so as to encompass all modifications, equivalent structures and functions.

This application claims the benefit of Japanese Application No. 2005-347151 filed Nov. 30, 2005, which is hereby incorporated by reference herein in its entirety.

What is claimed is:

1. A zoom lens system comprising:
a first lens unit having negative refractive power; and
a second lens unit having positive refractive power, wherein,
the first and second lens units are provided in order from the object side to the image side,
the distance between the first and second lens units change during zooming,
the first lens unit includes a compound optical element including a lens element and a resin layer having optical performance different from the optical performance of the lens element and being stacked on the lens element, and wherein the compound optical element satisfies $20 < |\nu dg - \nu dj|$ and $fg/fj < 0$, where fg represents the focal length of the lens element, νdg represents the Abbe number of the material of the lens element, fj represents the focal length of the resin layer, and νdj represents the Abbe number of the resin layer.

2. The zoom lens system according to claim 1, wherein, $0 < fw/fj < 1.0$, where fw represents the focal length of the zoom lens system at the wide-angle end.

3. The zoom lens system according to claim 1, wherein, $0.3 < fg/fa < 1.0$, where fa represents the focal length of the compound optical element.

4. The zoom lens system according to claim 1, wherein at least one of the surfaces of the lens element is aspherical.

5. The zoom lens system according to claim 1, wherein at least one of the surfaces of the resin layer is aspherical.

6. The zoom lens system according to claim 1, wherein the lens element is constructed by molding glass material.

7. The zoom lens system according to claim 1, wherein, $-2.100 \times 10^{-3} \cdot \nu dj + 0.693 < \theta gF$ and $0.555 < \theta gF < 0.9$, where θgF is the partial variance ratio of the resin layer, wherein θgF=(Ng−NF)/(NF−NC), wherein Ng, NF, Nd, and NC represent the indices of refraction of the resin layer material for the Fraunhofer lines, g-line, F-line, d-line, and C-line, respectively.

8. The zoom lens system according to claim 1, wherein, $-2.407 \times 10^{-3} \nu dj + 1.420 < \theta gd$ and $1.255 < \theta gd < 1.67$, where θgF is the partial variance ratio of the resin layer, wherein θgF=(Ng−NF)/(NF−NC), wherein Ng, NF, Nd, and NC represent the indices of refraction of the resin layer material for the Fraunhofer lines, g-line, F-line, d-line, and C-line, respectively.

9. The zoom lens system according to claim 1, wherein the material of the resin layer can satisfy the following condition:

$\nu dj < 55$.

10. The zoom lens system according to claim 1,
wherein the only lens units the zoom lens system includes are a first lens unit having negative refractive power and a second lens unit having positive refractive power, and wherein the first and second lens units are provided in order from the object side to the image side.

11. The zoom lens system according to claim 1,
wherein the only lens units the zoom lens system includes are a first lens unit having negative refractive power, a second lens unit having positive refractive power, and a third lens unit having positive refractive power,
wherein the first to third lens units are provided in order from the object side to the image side, and
wherein the distances between the lens units change during zooming.

12. The zoom lens system according to claim 1,
wherein the only lens units the zoom lens system includes are a first lens unit having negative refractive power, a second lens unit having positive refractive power, a third lens unit having negative refractive power, and a fourth lens unit having positive refractive power,
wherein the first to fourth lens units are provided in order from the object side to the image side, and
wherein the distances between the lens units change during zooming.

13. A zoom lens system comprising:
a first lens unit having negative refractive power; and
a second lens unit having positive refractive power, wherein,
the first and second lens units are provided in order from the object side to the image side,
the first lens unit includes a compound optical element including a lens element and a resin layer having optical performance different from the optical performance of the lens element and being stacked on the lens element, and wherein the compound optical element satisfies $31 < |vdg - vdj|$, where vdg represents the Abbe number of the lens element and vdj represents the Abbe number of the resin layer.

14. A zoom lens system configured to form an image on a photoelectric transducer, the zoom lens system comprising:
a first lens unit having negative refractive power; and
a second lens unit having positive refractive power, wherein,
the first and second lens units are provided in order from the object side to the image side,
the distance between the first and second lens units change during zooming,
the first lens unit includes a compound optical element including a lens element and a resin layer having optical performance different from the optical performance of the lens element and being stacked on the lens element, and wherein the compound optical element satisfies $20 < |vdg - vdj|$ and $fg/fj < 0$, where fg represents the focal length of the lens element, vdg represents the Abbe number of the material of the lens element, fj represents the focal length of the resin layer, and vdj represents the Abbe number of the resin layer.

15. An image-pickup apparatus comprising:
a zoom lens system according to claim 1; and
a photoelectric transducer configured to receive an image formed by the zoom lens system.

* * * * *